(12) United States Patent
Ong

(10) Patent No.: US 8,471,971 B2
(45) Date of Patent: Jun. 25, 2013

(54) LIQUID CRYSTAL DISPLAYS HAVING COLOR DOTS WITH EMBEDDED POLARITY REGIONS

(75) Inventor: Hiap L. Ong, Warren, NJ (US)

(73) Assignee: Hiap L. Ong and Kyoritsu Optronics, Co., Ltd. (TW)

( * ) Notice: Subject to any disclaimer, the term of this patent is extended or adjusted under 35 U.S.C. 154(b) by 398 days.

(21) Appl. No.: 12/721,536

(22) Filed: Mar. 10, 2010

(65) Prior Publication Data

US 2010/0289976 A1 Nov. 18, 2010

Related U.S. Application Data

(60) Continuation-in-part of application No. 12/573,085, filed on Oct. 2, 2009, which is a continuation-in-part of application No. 11/751,454, filed on May 21, 2007, and a continuation-in-part of application No. 11/751,454, filed on May 21, 2007, which is a continuation-in-part of application No. 11/751,387, filed on May 21, 2007, which is a continuation-in-part of application No. 11/227,595, filed on Sep. 15, 2005, and a continuation-in-part of application No. 12/492,098, filed on Jun. 25, 2009, which is a division of application No. 11/227,595, filed on Sep. 15, 2005.

(60) Provisional application No. 60/799,815, filed on May 22, 2006, provisional application No. 60/799,843, filed on May 22, 2006.

(51) Int. Cl.
*G09G 3/36* (2006.01)

(52) U.S. Cl.
USPC .......................................................... 349/37

(58) Field of Classification Search
USPC ................... 349/37, 129, 130, 139, 141, 143, 349/144, 145, 48
See application file for complete search history.

(56) References Cited

U.S. PATENT DOCUMENTS

| 7,663,708 B2 * | 2/2010 | Wang et al. ..................... 349/37 |
| 7,978,271 B2 * | 7/2011 | Wang et al. ..................... 349/37 |
| 2008/0106658 A1 * | 5/2008 | Wang et al. ..................... 349/37 |

* cited by examiner

*Primary Examiner* — Thoi Duong
(74) *Attorney, Agent, or Firm* — Silicon Valley Patent Group LLP; Edward S. Mao

(57) ABSTRACT

A multi-domain liquid crystal display is disclosed. The display includes embedded polarity regions within the color dots of the display. Specifically, the embedded polarity regions have a polarity that is different from the polarity of the color dot containing the embedded polarity region. This difference in polarity enhances the fringe fields of the color dot or in some situations may create additional fringe fields. The enhanced fringe fields or additional fringe fiends can more quickly restore liquid crystals to their proper position.

32 Claims, 30 Drawing Sheets

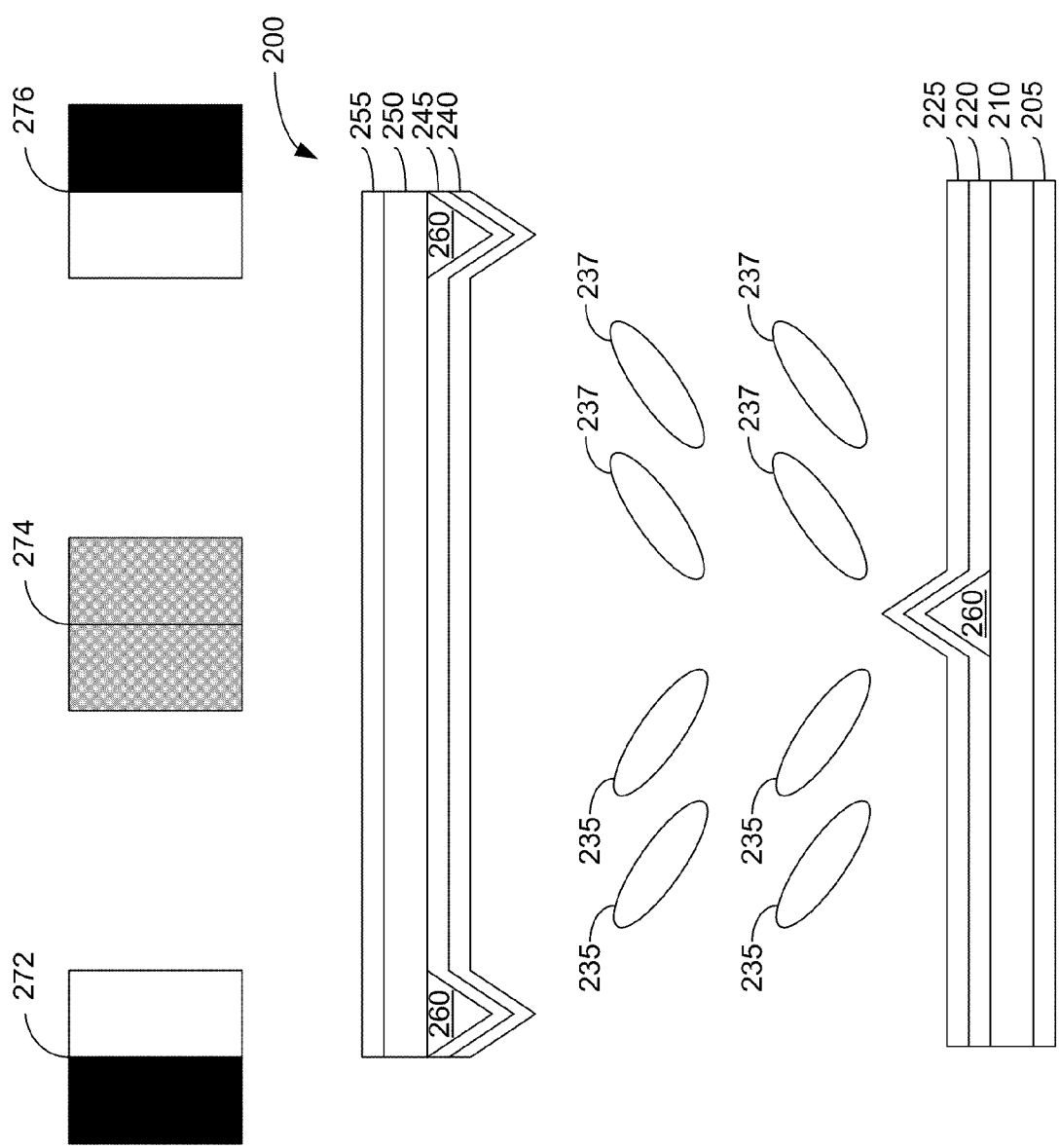

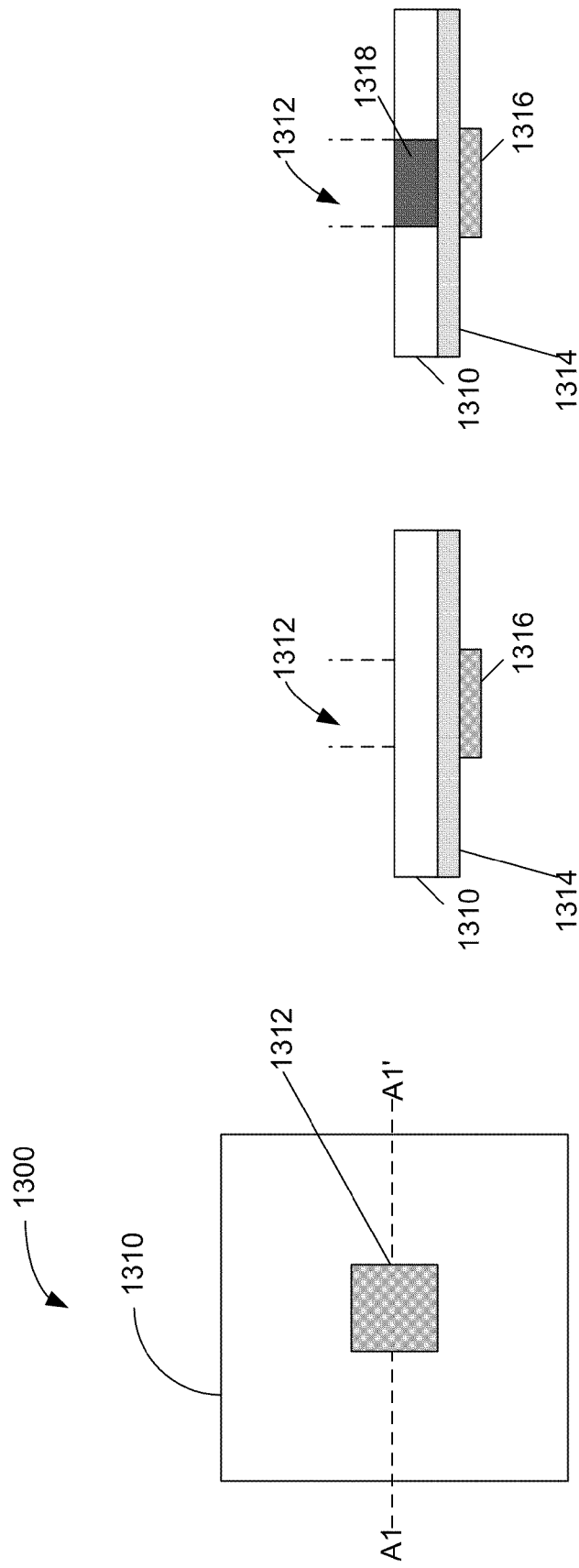

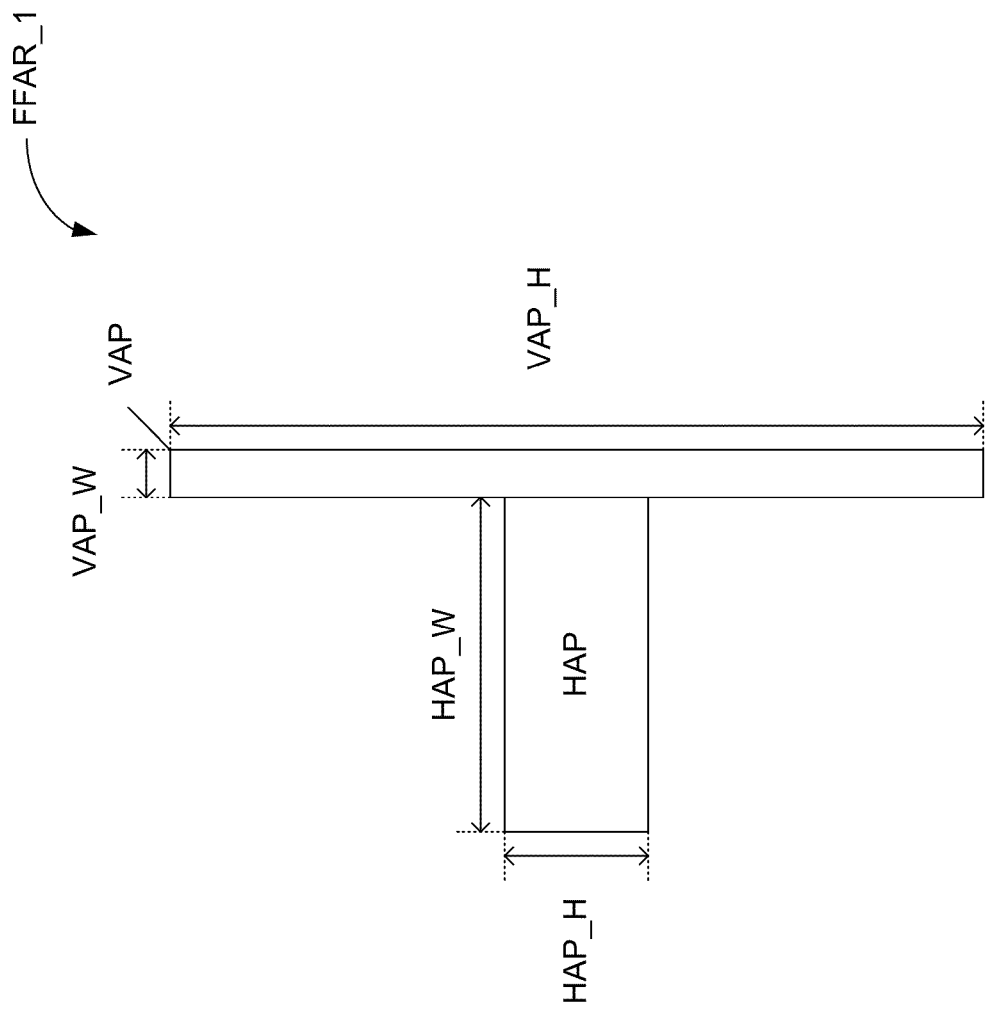

LIQUID CRYSTAL DISPLAYS HAVING COLOR DOTS WITH EMBEDDED POLARITY REGIONS

RELATED APPLICATIONS

The present application is a Continuation-In-Part of and claims the benefit of U.S. Utility patent application Ser. No. 12/573,085 entitled "Pixels having Fringe Field Amplifying Regions for Multi-Domain Vertical Alignment Liquid Crystal Displays" by Hiap L. Ong, filed Oct. 2, 2009, which is incorporated herein in its entirety by reference. U.S. Utility patent application Ser. No. 12/573,085, is also a Continuation-In-Part of and claimed the benefit of U.S. patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007, which is incorporated herein in its entirety by reference. U.S. Utility patent application Ser. No. 11/751,454 claimed the benefit of U.S. Provisional Patent Application Ser. No. 60/799,815, entitled "Multi-domain Vertical Alignment liquid crystal display with row inversion drive scheme", by Hiap L. Ong, filed May 22, 2006; and U.S. Provisional Patent Application Ser. No. 60/799,843, entitled "Method To Conversion of Row Inversion To Have Effective Pixel Inversion Drive Scheme", by Hiap L. Ong, filed May 22, 2006.

The present application is also a Continuation-In-Part of and claims the benefit of U.S. Utility patent application Ser. No. 11/751,454 (Publication serial number US 2008/0002072 A1), entitled "Pixels Using Associated Dot Polarity for Multi-Domain Vertical Alignment Liquid Crystal Displays" by Hiap L. Ong, filed May 21, 2007, which is incorporated herein in its entirety by reference. U.S. Utility patent application Ser. No. 11/751,454 claimed the benefit of U.S. Provisional Patent Application Ser. No. 60/799,815, entitled "Multi-domain Vertical Alignment liquid crystal display with row inversion drive scheme", by Hiap L. Ong, filed May 22, 2006; and U.S. Provisional Patent Application Ser. No. 60/799,843, entitled "Method To Conversion of Row Inversion To Have Effective Pixel Inversion Drive Scheme", by Hiap L. Ong, filed May 22, 2006.

The present application is also a Continuation-In-Part of and claims the benefit of U.S. Utility patent application Ser. No. 11/751,387 (Publication serial number US 2009/00262271 A1), entitled "Large Pixel Multi-Domain Vertical Alignment Liquid Crystal Display Using Fringe Fields" by Hiap L. Ong, filed May 21, 2007, and is incorporated herein in its entirety by reference. U.S. Utility patent application Ser. No. 12/751,387 is a continuation-in-part of U.S. Utility patent application Ser. No. 11/227,595 (now issued as U.S. Pat. No. 7,630,033), entitled "Large Pixel multi-domain vertical alignment liquid crystal display using fringe fields" by Hiap L. Ong, filed Sep. 15, 2005, and is incorporated herein in its entirety by reference.

The present application is a Continuation-In-Part of and claims the benefit of U.S. Utility patent application Ser. No. 12/492,098 (Publication serial number US 2009/00262271 A1), entitled "Large Pixel Multi-Domain Vertical Alignment Liquid Crystal Display Using Fringe Fields" by Hiap L. Ong, filed Jun. 25, 2009, and is incorporated herein in its entirety by reference. U.S. Utility patent application Ser. No. 12/492,098 is a divisional of U.S. Utility patent application Ser. No. 11/227,595 (now issued as U.S. Pat. No. 7,630,033), entitled "Large Pixel multi-domain vertical alignment liquid crystal display using fringe fields" by Hiap L. Ong, filed Sep. 15, 2005, and is incorporated herein in its entirety by reference.

BACKGROUND OF THE INVENTION

1. Field of the Invention

The present invention relates to liquid crystal displays (LCDs). More specifically, the present invention relates large-pixel multi-domain vertical alignment LCDs, which can be manufactured with smooth substrates.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawback of conventional twisted nematic LCDs is the viewing angle is very narrow and the contrast ratio is low. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1(a)-1(c) illustrate the basic functionality of a pixel of a vertical alignment LCD 100. For clarity, the LCD of FIG. 1 uses only a single domain. Furthermore, for clarity, the LCDs of FIGS. 1(a)-1(c) (and FIG. 2) described in terms of gray scale operation. Furthermore, FIGS. 1(a)-1(c) is simplified to clarity and omits many processing layers. For example, between substrate 110 and electrode 120, actual displays would likely include various metal layers used for electrical connections as well as insulating layers that separate the metal layers.

LCD 100 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 12 million liquid crystal molecules in a pixel that is 120 µm width by 300 µm length by 3 µm height. Although not shown, many liquid crystal displays (particularly active matrix LCDs) include a passivation layer on bottom of first electrode 120. The passivation layer serves as an insulating layer between the first electrode 120 and devices and conductors that may be formed on the substrate. The passivation layer is commonly formed using silicon nitrides.

In FIG. 1(a), liquid crystals 130 are vertically aligned. In the vertical alignment, liquid crystals 130 would not rotate light polarization from the light source. Thus, light from the light source would not pass through LCD 100 and gives a completely optical black state and a very high contrast ratio for all color and all cell gap. Consequently MVA LCDs provide a big improvement on the contrast ratio over the conventional low contrast twisted nematic LCDs. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 120 is not uniform to viewers at different viewing angles. As illustrated in FIG. 1(c), a viewer 172 that is left of center would see a bright pixel because the broad (light rotating) side of liquid crystals 130 face viewer 172. A viewer 174 that is centered on the pixel would see a gray pixel because the broad side of liquid crystals 130 is only partially facing viewer 174. A viewer 176 that is right of center would see a dark pixel because the broad side of liquid crystals 130 is barely facing viewer 176.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that the LC orientation in a pixel is divided into 4 major domains to provide wide symmetrical viewing angles both vertically and horizontally.

Thus, multi-domain vertical alignment liquid crystal displays, provide wide symmetrical viewing angles, however, the cost of manufacturing MVA LCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate; any misalignment between the top and bottom substrates will reduce the product yield. Other techniques of using physical features to the substrates, such as ITO slits, which have been used in place of or in combination with the protrusions, are also very expensive to manufacture. Furthermore, the protrusions and ITO slits inhibit light transmission and thus reduce the brightness of the MVA LCDs.

However, MVA LCDs have been developed that do not require the use of physical features (such as protrusions or ITO slits) on the substrate. Specifically, these MVA LCDs use fringe fields to create multiple-domains. Without the requirement of physical features the difficulty of aligning the physical features of the top and bottom substrate is eliminated. Thus, MVA LCDs using fringe fields have higher yield and are less expensive to manufacture than MVA LCDs that use physical features on the substrates.

FIGS. 3(a) and 3(b) illustrate the basic concept used to create a multi-domain vertical alignment liquid crystal display (MVA LCD) 300 without resorting to physical features on the substrates. Specifically FIG. 3 shows pixels 310, 320, and 330 in between a first substrate 305 and a second substrate 355. A first polarizer 302 is attached to first substrate 305 and a second polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. Although not shown, many liquid crystal displays include a passivation layer on top of electrodes 311, 321, and 331. The electrodes are typically constructed using a transparent conductive material such as ITO. Furthermore, a first alignment layer 307 covers the electrodes on first substrate 305. Similarly a second alignment layer 352 covers the electrodes on second substrate 355. Both LC alignment layers 307 and 352 provide a vertical LC alignment. As explained in more detail below, electrodes 315, 325, and 335 are held at a common voltage V_Com. Therefore, to ease manufacturing, electrodes 315, 325, and 335 are created as a single structure (as shown in FIGS. 3(a) and 3(b)). MVA LCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame. In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the voltage polarity of the electrodes. Thus, electrodes 311, and 331 have positive voltage polarity and electrodes 321 has negative voltage polarity. Substrate 355 and electrodes 315, 325, and 335 are kept at common voltage V_com. The voltage polarity is defined with respect to the V_com voltage, where a positive polarity is obtained for voltages higher than V_com, and a negative polarity is obtained for voltage smaller than V_com. Electric field 327 (illustrated using field lines) between electrodes 321 and 325 causes liquid crystals 322 and liquid crystals 323 to tilt. In general, without protrusions or other features the tilting direction of the liquid crystals is not fixed for liquid crystals with a vertical LC alignment layers at 307 and 352. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe field between electrode 321 and electrode 325 cause liquid crystals 323 to tilt to the right to form one domain and cause liquid crystals 322 to tilt to the left to from a second domain. Thus, pixel 320 is a multi-domain pixel with a wide symmetrical viewing angle Similarly, the electric field (not shown) between electrode 311 and electrode 315 would have fringe fields that cause liquid crystals 313 to reorientate and tilt to the right in the right side in pixel 312 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels amplifies the fringe field effect in each pixel. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge of the pixels would exhibit random behavior and would not produce a multi-domain pixel. Generally, fringe field effects of pixels would not be effective to control liquid crystal tilt when the pixels become larger than 40-60 μm. Therefore, for large pixel LCDs pixel division methods are used to achieve multi-domain pixels. Specifically, for color LCDs, pixels are divided into color components. Each color component is controlled by a separate switching element, such as a thin-film transistor (TFT). Generally, the color components are red, green, and blue. The color components of a pixel are further divided into color dots.

The polarity of each pixel switches between each successive frame of video to prevent image quality degradation, which may result from twisting the liquid crystals in the same direction in every frame. However, the dot polarity pattern switching may cause other image quality issues such as flicker if all the switching elements are of the same polarity. To minimize flicker, the switching elements (e.g. are transistors) are arranged in a switching element driving scheme that include positive and negative polarities. Furthermore, to minimize cross talk the positive and negative polarities of the switching elements should be arranged in a uniform pattern, which provides a more uniform power distribution. The three main switching element driving schemes are switching element point inversion driving scheme, switching element row inversion driving scheme, and switching element column inversion driving scheme. In the switching element point inversion driving scheme, the switching elements form a checkerboard pattern of alternating polarities. In the switching element row inversion driving scheme, the switching elements on each row have the same polarity; however, each switching element in one row has the opposite polarity as compared to the polarity of switching elements in adjacent rows. In the switching element column inversion driving scheme, the switching elements on each column have the same polarity; however, a switching element in one column has the opposite polarity as compared to the polarity of switching elements in adjacent columns. While the switching element point inversion driving scheme provides the most uniform power distribution, the complexity and additional costs of switching element point inversion driving scheme over switching element row inversion driving scheme or switching element column inversion driving scheme may not be cost effective. Thus, most LCD displays for low cost or low voltage applications are manufactured using switching element row inversion driving scheme while switching element point inversion driving scheme is usually reserved for high performance applications.

Pixels may include various key components arranged to achieve high quality low cost display units. For example, pixel can include color components, color dots, fringe field amplifying regions (FFAR), switching elements, device component areas, and associated dots. Displays using these various components are described in U.S. Patent Application "Cite various KYO Patents KYO-001 KYO-003, KYO-005, KYO-006", which are incorporated herein by reference.

Device component area encompasses the area occupied by the switching elements and/or storage capacitor as well as the area that was used to manufacture the switching elements and/or storage capacitors. For clarity, a different device component area is defined for each switching element.

Associated dots and fringe field amplifying regions are polarized areas that are not part of the color components. Associated dots cover the device component areas. Generally, the associated dots are manufactured by depositing an insulating layer over the switching element and/or storage capacitors. Followed by depositing an electrically conductive layer to form the associated dot. The associated dots are electrically connected to specific switching element and or other polarized components (such as color dots). The storage capacitors are electrically connected to specific switching element and color dot electrodes to compensate and offset the capacitance change on the liquid crystal cells during the switching-on and switching-off processes of the liquid crystal cells. Consequently, the storage capacitors are used to reduce the crosstalk effects during the switching-on and switching-off processes of the liquid crystal cells. A patterning mask is used when it is necessary to form the patterned electrode for the associated dots. A color layer is added to form a light shield for the associated dot. In general, the color layer is black however some displays use different color to achieve a desired color pattern or shading. Generally, the color layer is achieved by depositing a color filter layer on the corresponding ITO glass substrate. Specifically, a patterned color filter layer is deposited between second substrate 150 and second electrode 140 with pattern corresponding to the color for the color dot and associated dots. However, some displays may also place a patterned color filter layer underneath the electrode layer of the color dots, associated dots, or DCA on the substrate.

In some displays, the associated dot is an area independent of the switching elements. Furthermore, displays have additional associated dots not directly related to the switching elements. Generally, the associated dot includes an active electrode layer such as ITO or other conductive layer, and is connected to a nearby color dot or powered in some other manner. For opaque associated dots, a black matrix layer can be added on the bottom of the conductive layer to form the opaque area. The black matrix can be fabricated on the ITO glass substrate side to simplify the fabrication process. The additional associated dots improve the effective use of display area to improve the aperture ratio and to form the multiple liquid crystal domains within the color dots. Some displays also use associate dots to improve color performance. For example, careful placement of associated dots can allow the color of nearby color dots to be modified from the usual color pattern.

Fringe field amplifying regions are more versatile than associated dots. Specifically, fringe field amplifying regions may have non-rectangular shapes, although generally, the overall shape of the fringe field amplifying regions can be divided into a set of rectangular shapes. Furthermore, fringe field amplifying regions extend along more than one side of a color dot. In addition, fringe field amplifying regions may be used in place of associated dots in some displays. Specifically, in these displays the fringe field amplifying region cover the device component areas but also extend along more than one side of color dots adjacent to the device component areas.

In general, the color dots, device component areas, and associated dots are arranged in a grid pattern and are separated from adjacent neighbors by a horizontal dot spacing HDS and a vertical dot spacing VDS. When fringe field amplifying regions are used in place of associated dots, part of the fringe field amplifying regions would also fit in the grid pattern. In some displays multiple vertical dot spacings and multiple horizontal dot spacings may be used. Each color dot, associated dot, and device component area has two adjacent neighbors (e.g. color dots, associated dots, or device component areas) in a first dimension (e.g. vertical) and two adjacent neighbors in a second dimension (e.g. horizontal). Furthermore, two adjacent neighbors can be aligned or shifted. Each color dot has a color dot height CDH and a color dot width CDW. Similarly, each associated dot has an associated dot height ADH and an associated dot width ADW. Furthermore, each device component area has device component area height DCAH and a device component area width DCAW. In some displays, color dots, associated dots and device component areas are the same size. However in many displays color dots, associated dots and device component areas could be of different size or shapes. For example in many displays associated dots have a smaller height than color dots.

When a LCD panel is subject to external touch pressure on the panel substrate, touch mura occurs. Touch mura effects due to physical disturbance of the liquid crystals is a major issue with vertically aligned liquid crystal displays (both single domain and multiple domain). Touch mura effects refer to irregular patterns or regions causing uneven screen uniformity. Physical disturbance of the liquid crystals may be caused by shaking, vibration, and pressure on the display. In particular, vertically aligned liquid crystal displays are very susceptible to touch mura effects caused by pressure on the display. Specifically, pressure on a vertically aligned liquid crystal display may flatten the liquid crystals and cause a disturbance effect on the display. Unfortunately, devices incorporating touch screen functionality (i.e. users of a device apply pressure on the surface of the display as a means of providing user input to the device) has become increasingly popular which may hinder acceptance of vertically aligned liquid crystal displays. Hence there is a need for a method or system to minimize touch mura effects in a vertically aligned liquid crystal display.

SUMMARY

Accordingly, the present invention provides a vertically aligned liquid crystal display with reduced touch mura effects. Specifically, embodiments of the present invention use novel pixel designs that have color dots with embedded polarity regions (EPR) which amplifies fringe fields that more quickly restore the liquid crystals to their proper positions. For example, in accordance with one embodiment of the present invention, pixels are sub-divided into color components having one or more color dots (CDs). Furthermore in some embodiments of the present invention, the embedded polarity regions can be used to create or enhance fringe field effects that can induce multiple domains in the liquid crystals to enhance the viewing angle of the display.

In one embodiment of the present invention, a display includes a first pixel having a first first-pixel switching element; a first electrode coupled to the first first-pixel switching element, and a second pixel. The second pixel includes a first second-pixel color component that includes a first second-pixel first-component color dot and a second second-pixel first-component color dot. The second pixel also includes a first second-pixel switching element coupled to the first second-pixel first-component color dot and a second second-pixel first-component color dot. The first electrode is located between the first second-pixel first-component color dot and a second second-pixel first-component color dot. The first second-pixel first-component color dot includes a first embedded polarity region and a second second-pixel first-component color dot includes a second embedded polarity region. In general, when the first first-pixel switching element is configured to have a first polarity, the first second-pixel switching element is configured to have a second polarity. The first electrode could be for example a color dot, an associated dot, or a fringe fiend amplifying region.

The present invention will be more fully understood in view of the following description and drawings.

BRIEF DESCRIPTION OF THE DRAWINGS

FIG. 2 is an illustration of a pixel of a conventional multi-domain vertical alignment LCD.

FIGS. 13(a)-13(c) illustrate a color dot in accordance with one embodiment of the present invention.

FIGS. 16(a)-16(c) illustrate a pixel design in accordance with one embodiment of the present invention.

DETAILED DESCRIPTION

As explained above, conventional vertically aligned LCDs are very susceptible to touch mura effects caused by physical disturbances to the liquid crystals. However, vertically aligned LCDs in accordance with the principles of the present invention use color dots that have embedded polarity regions (EPR) that enhance additional lateral fringe fields that help restore the liquid crystals to their proper orientation after a physical disturbance. Thus, vertically aligned LCDs in accordance with the present invention can quickly resolve touch mura effects caused by physical disturbance of the liquid crystals.

Figure 4A:
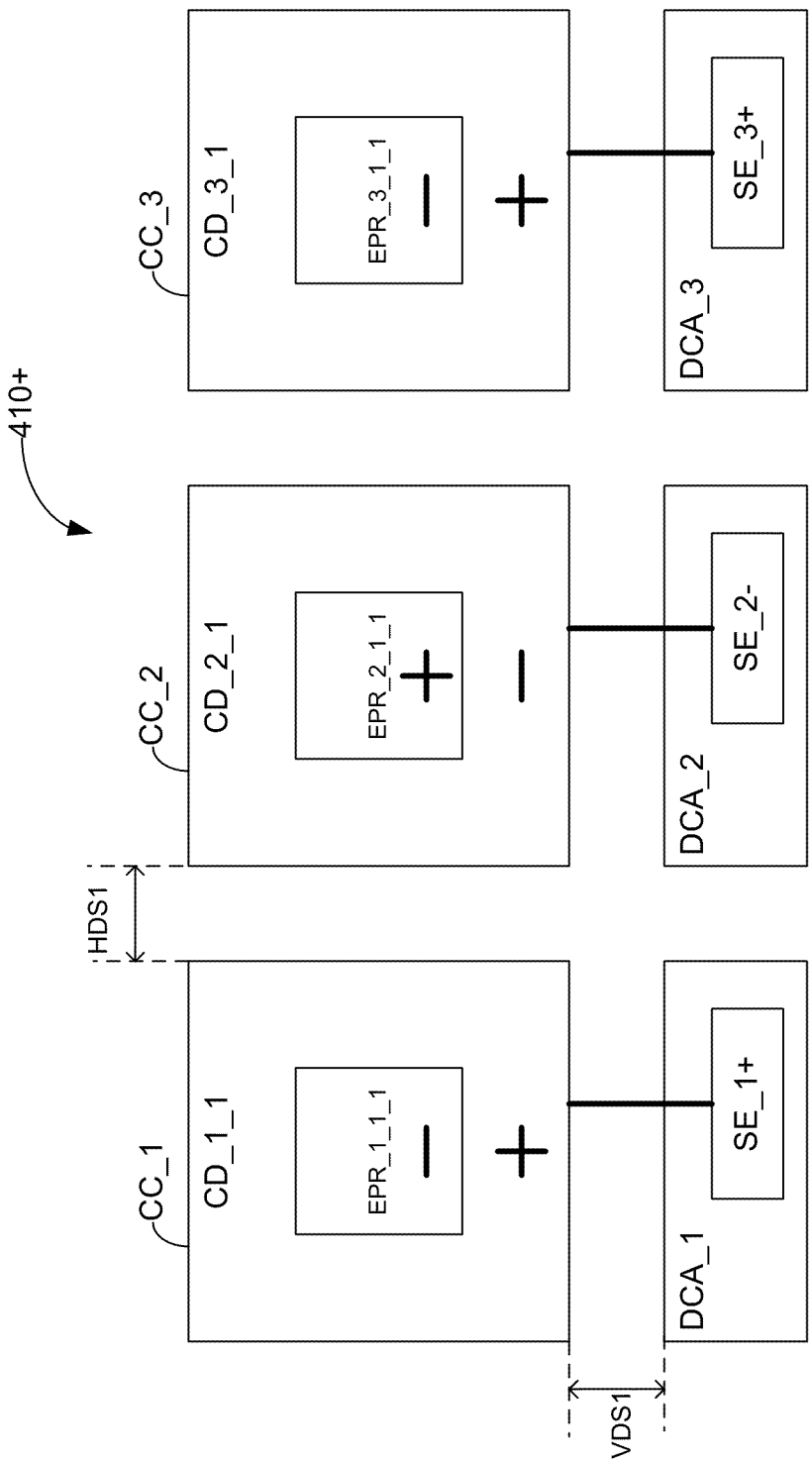
FIGS. 4(a)-4(b) illustrate a pixel design in accordance with one embodiment of the present invention.
Figure 4B:
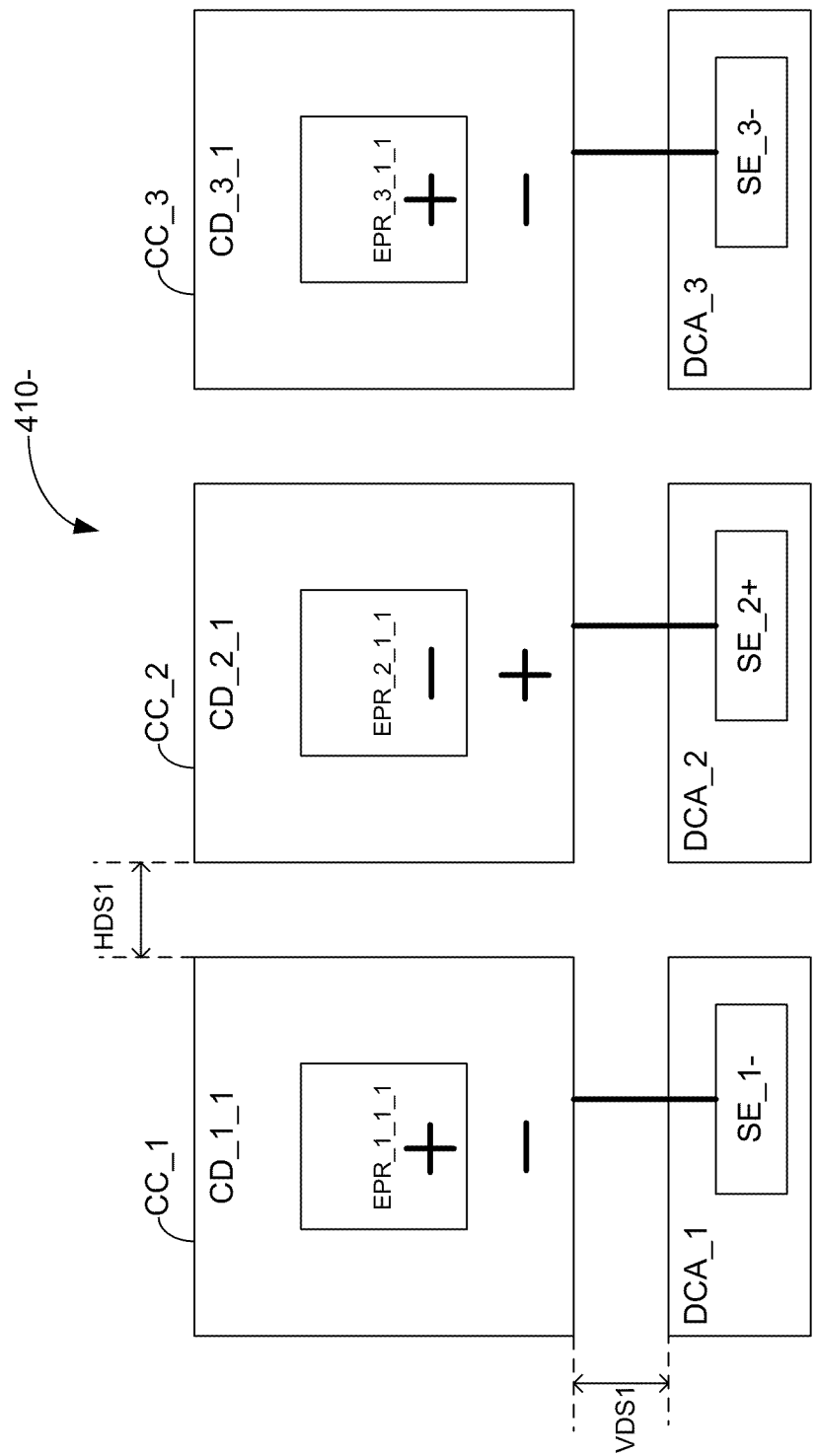

FIGS. 4(a) and 4(b) show different dot polarity patterns of a pixel design 410 (labeled 410+ and 410− as described below) in accordance with one embodiment of the present invention. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 4(a), pixel design 410 has a positive dot polarity pattern (and is thus labeled 410+) and in FIG. 4(b), pixel design 410 has a negative dot polarity pattern (and is thus labeled 410−). Furthermore, the polarity of each polarized component in the various pixel designs are indicated with "+" for positive polarity or "−" for negative polarity.

Pixel design 410 has three color components CC_1, CC_2 and CC_3. Each of the three color components includes one color dots. For clarity, the color dots are referenced as CD_X_Y, where X is a color component (from 1 to 3 in FIGS. 4(a)-4(b)) and Y is a dot number (In FIGS. 4(a)-4(b) Y is always 1). Pixel design 410 also includes a switching element for each color component (referenced as SE_1, SE_2, and SE_3) and a device component area for each color component (referenced as DCA_1, DCA_2, and DCA_3). Switching elements SE_1, SE_2, and SE_3 are arranged in a row. Device component areas DCA_1, DCA_2, and DCA_3 surround switching elements SE_1, SE_2, and SE_3, respectively.

First color component CC_1 of pixel design 410 has one color dots CD_1_1. Color dots CD_1_1 is horizontally aligned with drive component area DCA_1 and vertically separated from drive component area DCA_1 by a vertical dot spacing VDS1. Switching element SE_1 is coupled to the electrodes of color dot CD_1_1 to control the polarity of color dot CD_1_1. Color dot CD_1_1 includes an embedded polarity region EPR_1_1_1. For clarity, the embedded polarity regions are referenced as EPR_X_Y_Z, where X is a color component, Y is a dot number, and Z is enumerates the embedded polarity regions within a color dot. Embedded polarity regions can have different shapes. For example, in pixel design 410 embedded polarity regions have a square shape. However other embodiments may have circular shapes, polygonal shapes (such as squares and hexagons), or even other irregular shapes.

In general polarity refers to the direction of polarity usually denoted as positive or negative. More precisely, polarity also includes a magnitude of polarity. Embedded polarity regions may have the same direction of polarity (i.e. positive or negative) as the color dot but have a different magnitude of polarity. Furthermore, embedded polarity regions may have different polarity (i.e. "direction of polarity") than the color dot (e.g. positive polarity for color dot polarity with negative polarity for embedded polarity regions). In addition, embedded polarity regions can have neutral polarity. Different embodiments of the present invention use different novel techniques or combination of novel techniques to create the embedded polarity regions within the color dots. These techniques are described in detail below. In the embodiment of FIGS. 4(a) and 4(b), color dots have opposite polarity with the embedded polarity region within the color dot.

Second color component CC_2 of pixel design 410 has one color dots CD_2_1. Color dots CD_2_1 is horizontally aligned with drive component area DCA_2 and vertically separated from drive component area DCA_2 by vertical dot spacing VDS1. Color dot CD_2_1 is vertically aligned with color CD_1_1 and horizontally separated from color dot CD_1_1 by a horizontal dot spacing HDS1. Switching element SE_2 is coupled to the electrodes of color dot CD_2_1 to control the polarity of color dot CD_2_1. Color dot CD_2_1 includes an embedded polarity region EPR_2_1_1.

Third color component CC_3 of pixel design 410 has one color dots CD_3_1. Color dots CD_3_1 is horizontally aligned with drive component area DCA_3 and vertically separated from drive component area DCA_3 by vertical dot spacing VDS1. Color dot CD_3_1 is vertically aligned with color CD_2_1 and horizontally separated from color dot CD_2_1 by a horizontal dot spacing HDS1. Switching element SE_3 is coupled to the electrodes of color dot CD_3_1 to control the polarity of color dot CD_3_1. Color dot CD_3_1 includes an embedded polarity region EPR_3_1_1.

The polarities of the color dots, embedded polarity regions, and switching elements are shown using "+" and "−" signs. Thus, in FIG. 4(a), which shows the positive dot polarity pattern of pixel design 410+, switching elements SE_1 and SE_3; color dots CD_1_1 and CD_3_1, and embedded polarity region EPR_2_1_1 have positive polarity. However, switching element SE_2; color dot CD_2_1, and embedded polarity region2 EPR_1_1_1 and EPR_3_1_1 have negative polarity.

Figure 5B:
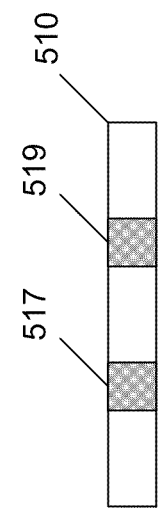
FIGS. 5(a)-5(b) illustrate a color dot in accordance with one embodiment of the present invention.
Figure 5A:
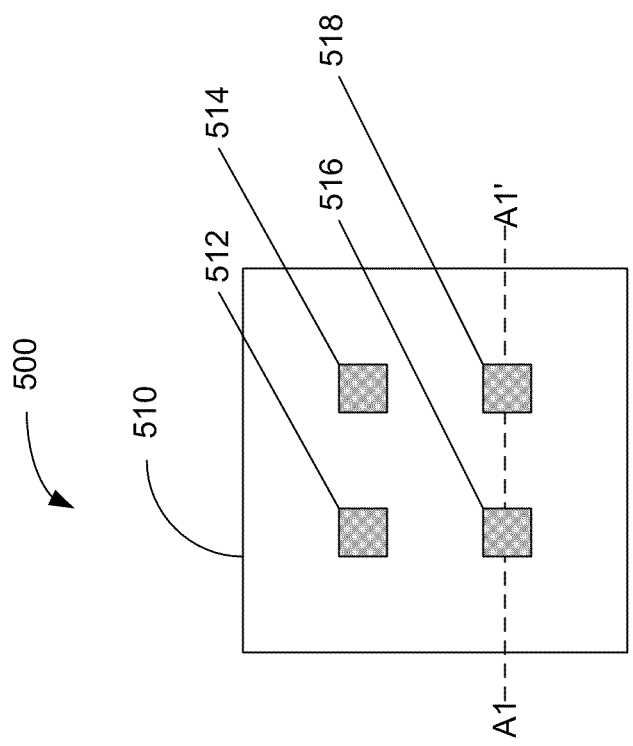

FIGS. 5(a) and 5(b) show portions of a color dot 500, having a square shape electrode 510, with four square shaped embedded polarity regions 512, 514, 516, and 518. FIG. 5(b) is a cross sectional view of color dot 500 along the A1-A1' cut of FIG. 5(a). As shown in FIG. 5(b), the embedded polarity regions of color dot 500 are created by changing the conductivity of electrode 510 in the areas of embedded polarity regions. Specifically, changed conductivity regions 517 and 519, which correspond to embedded polarity regions 516 and 518, respectively, are formed in electrode 510. In one embodiment of the present invention, the changed conductivity regions are heavily doped to reduce the conductivity of the changed conductivity regions. In other embodiments of the present invention, the embedded polarity regions can be formed by etching portions of conductor 510 and filling the regions with a less conductive material, such as electroactive polymers (such as polyacetylene, polythiophene, polypyrrole (PPy), polyaniline (PANI), and polystyrene), silicon-germanium and aluminum gallium arsenide, or a non-conductive material, such as silicon dioxide. Due to the different conductivity in the changed conductivity regions, the electric fields in the embedded polarity regions differ from the electric fields around the rest of electrode 510. The interactions between the electric fields of the embedded polarity regions and the rest of electrode 510 creates lateral forces that can more quickly reorient the liquid crystals to their proper position after a physical disturbance. In embodiments of the present invention, that use non-conductive material for embedded polarity regions, the embedded polarity regions would have a neutral polarity.

Figure 6C:
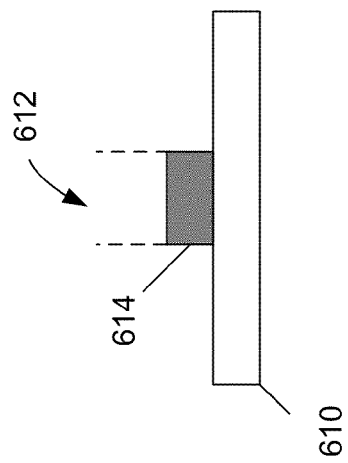
FIGS. 6(a)-6(c) illustrate a color dot in accordance with one embodiment of the present invention.
Figure 6B:
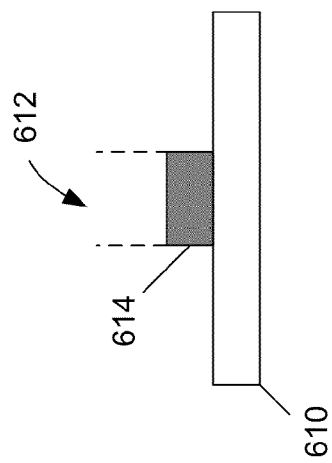
Figure 6A:
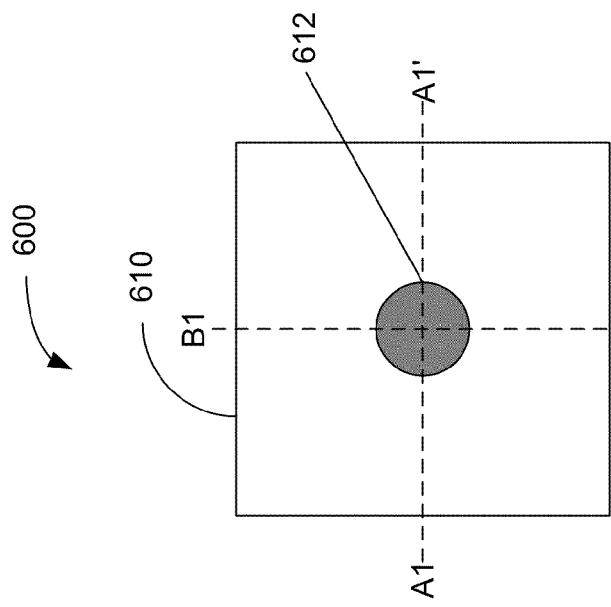

FIG. 6(a)-6(c) show portions of a color dot 600, having a square shape electrode 610, with an embedded polarity region 612, having a circular base shape. FIG. 6(b) is a cross sectional view of color dot 600 along the A1-A1' cut of FIG. 6(a). FIG. 6(c) is a cross sectional view of color dot 700 along the B1-B1' cut of FIG. 6(a). As shown in FIG. 6(b), embedded polarity region 612 is created by a field reduction layer 614, which reduces the electric field from the portion of conductor 610 in embedded polarity region 612. Thus, the magnitude of the polarity within embedded polarity region 612 differs from the rest of color dot 600. Depending on the specific properties of field reduction layer 614, the magnitude of the polarity in embedded polarity region 612 can be selectively reduced. With complete reduction, the polarity of embedded polarity region 612 can be set to neutral. A dielectric material, passivation layer, or black matrix material, can be used as the field reduction material in field reduction layer 614. As shown in FIGS. 6(a), 6(b) and 6(c), field reduction layer 614 has a three dimensional cylindrical shape.

Figure 7C:
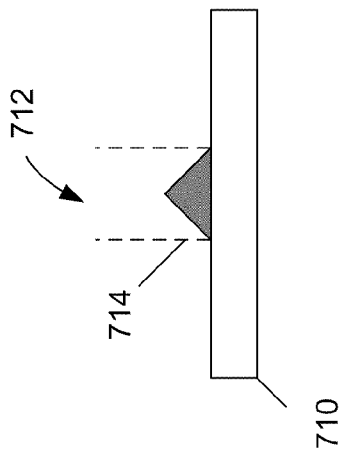
FIGS. 7(a)-7(c) illustrate a color dot in accordance with one embodiment of the present invention.
Figure 7B:
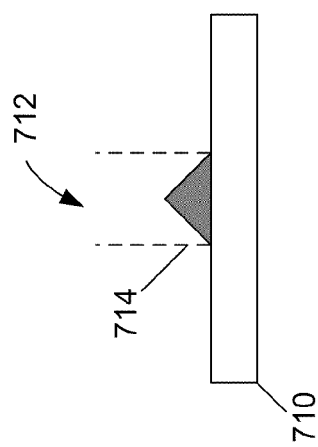
Figure 7A:
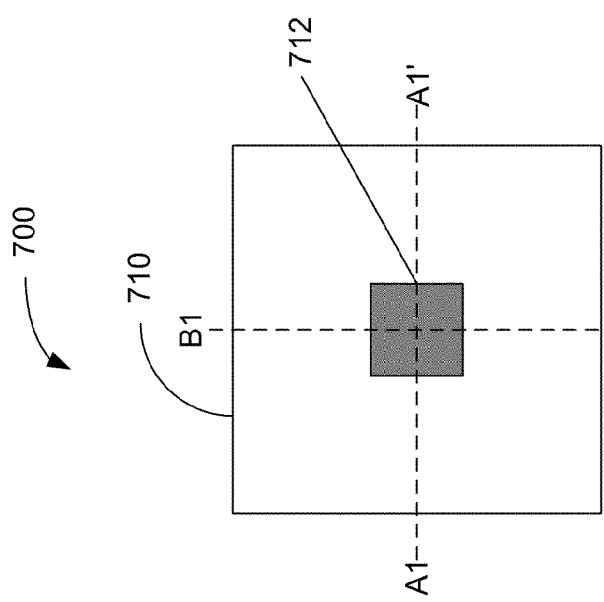

However, in other embodiments of the present invention, field reduction layer 614 can have a variety of three dimensional shapes with varying combination of base shapes and sides. For example, FIG. 7(a)-7(c) show portions of a color dot 700, having a square shape electrode 710, with an embedded polarity region 712, having a square base shape in accordance with one embodiment of the present invention. FIG. 7(b) is a cross sectional view of color dot 700 along the A1-A1' cut of FIG. 7(a). FIG. 7(c) is a cross sectional view of color dot 700 along the B1-B1' cut of FIG. 7(a). As shown in FIGS. 7(b) and 7(c), field reduction layer 714 has sloping sides which form a three-dimensional pyramidal shape.

Figure 8C:
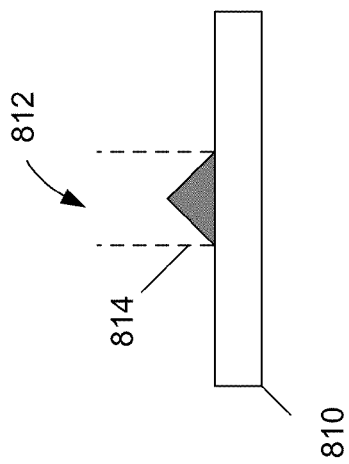
FIGS. 8(a)-8(c) illustrate a color dot in accordance with one embodiment of the present invention.
Figure 8B:
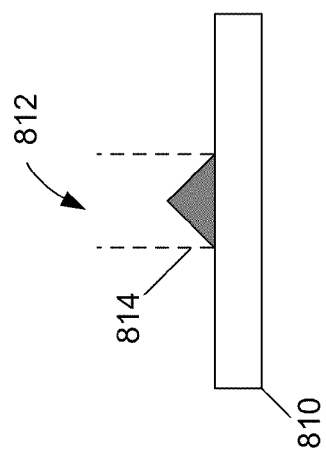
Figure 8A:
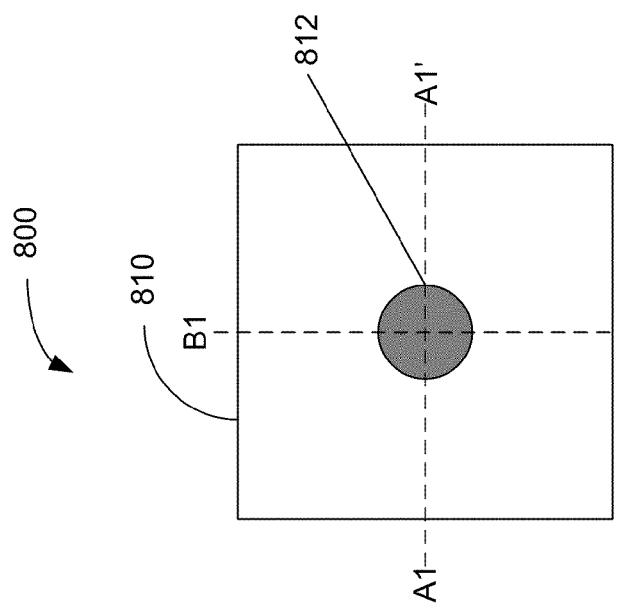

FIG. 8(a)-8(c) show portions of a color dot 800, having a square shape electrode 810, with an embedded polarity region 812, having a circular base shape in accordance with one embodiment of the present invention. FIG. 8(b) is a cross sectional view of color dot 800 along the A1-A1' cut of FIG. 8(a). FIG. 8(c) is a cross sectional view of color dot 800 along the B1-B1' cut of FIG. 8(a). As shown in FIGS. 8(b) and 8(c), field reduction layer 814 has sloping sides which form a three-dimensional cone shape.

Figure 9C:
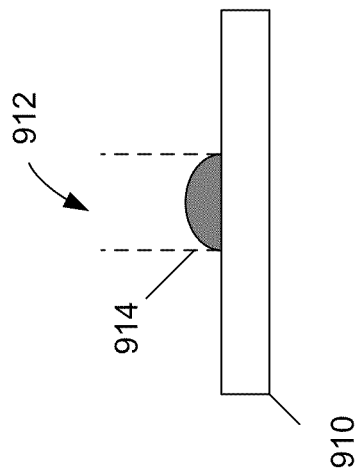
FIGS. 9(a)-9(c) illustrate a color dot in accordance with one embodiment of the present invention.
Figure 9B:
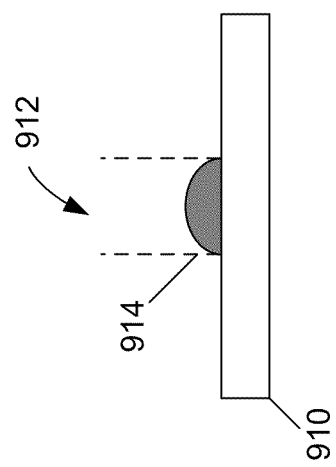
Figure 9A:
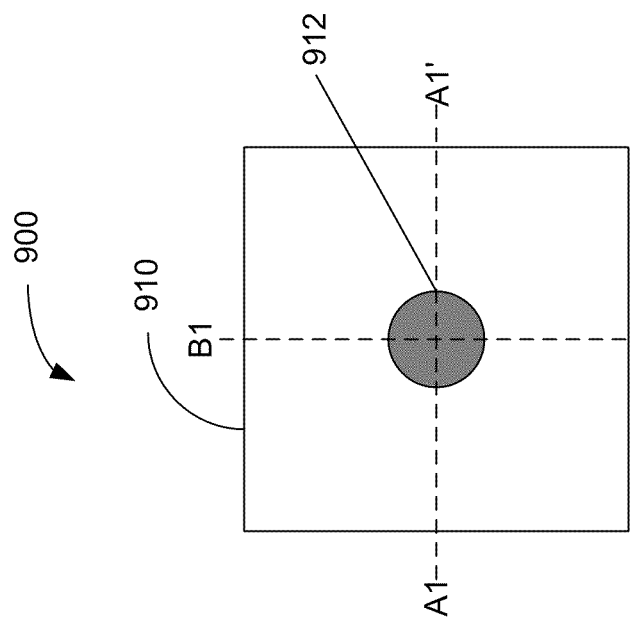

FIG. 9(a)-9(c) show portions of a color dot 900, having a square shape electrode 910, with an embedded polarity region 912, having a circular base shape in accordance with one embodiment of the present invention. FIG. 9(b) is a cross sectional view of color dot 900 along the A1-A1' cut of FIG. 9(a). FIG. 9(c) is a cross sectional view of color dot 900 along the B1-B1' cut of FIG. 9(a). As shown in FIGS. 9(b) and 9(c), field reduction layer 914 has curved sloping sides which form a three-dimensional rounded concave shape, which could be an oblate spheroid or other ellipsoid.

Figure 10C:
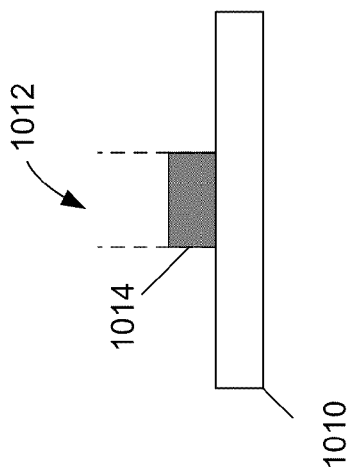
FIGS. 10(a)-10(c) illustrate a color dot in accordance with one embodiment of the present invention.
Figure 10B:
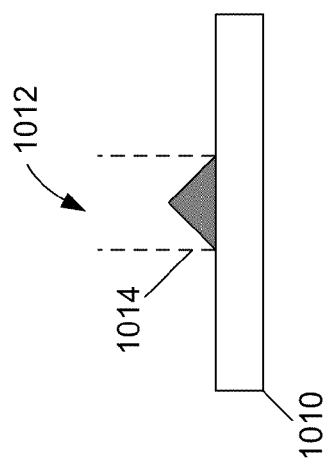
Figure 10A:
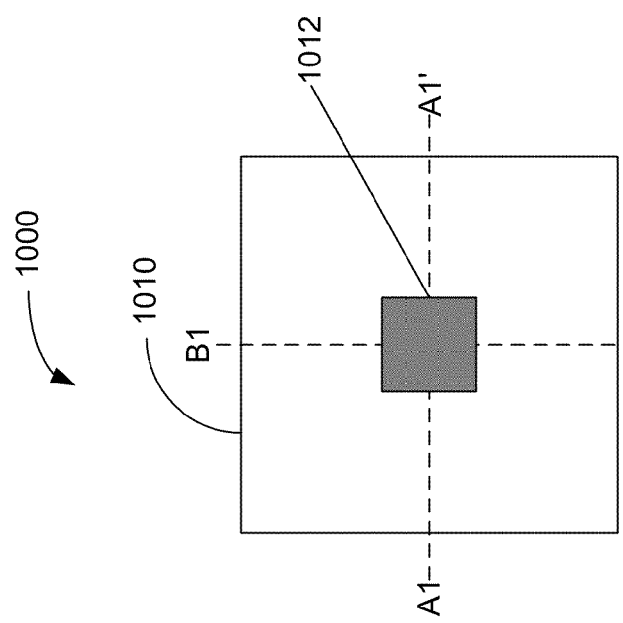

FIG. 10(a)-10(c) show portions of a color dot 1000, having a square shape electrode 1010, with an embedded polarity region 1012, having a circular base shape in accordance with one embodiment of the present invention. FIG. 10(b) is a cross sectional view of color dot 1000 along the A1-A1' cut of FIG. 10(a). FIG. 10(c) is a cross sectional view of color dot 1000 along the B1-B1' cut of FIG. 10(a). As shown in FIG. 10(b) along the A1-A1' cut, field reduction layer has a triangular shape. However as shown in FIG. 10(c) along the B1-B1' cut, field reduction layer 1014 has a rectangular shape. Thus, field reduction layer 1014 has a three dimensional triangular solid shape.

Figure 11C:
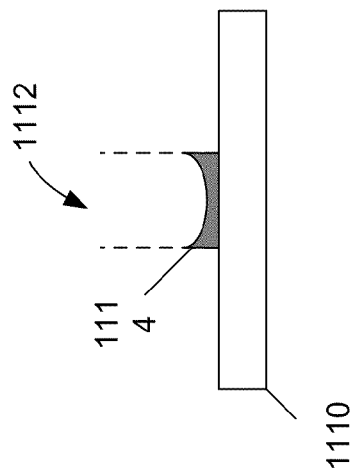
FIGS. 11(a)-11(c) illustrate a color dot in accordance with one embodiment of the present invention.
Figure 11B:
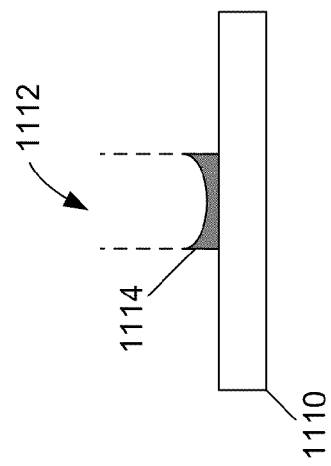
Figure 11A:
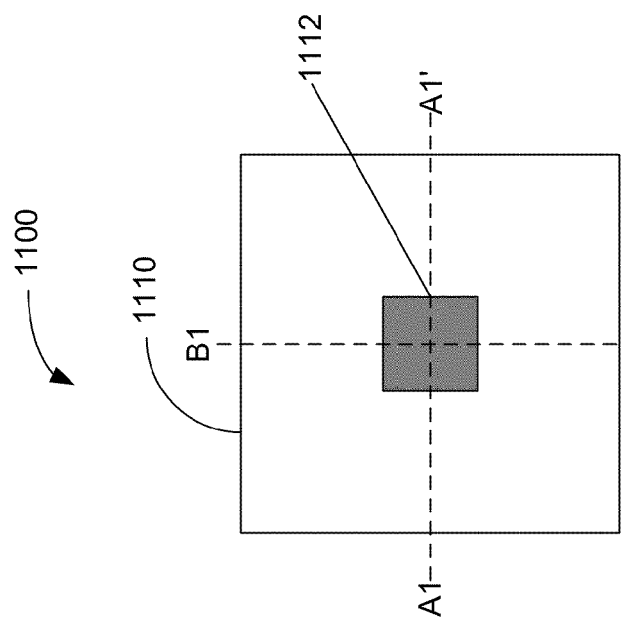

FIG. 11(a)-11(c) show portions of a color dot 1100, having a square shape electrode 1110, with an embedded polarity region 1112, having a circular base shape in accordance with one embodiment of the present invention. FIG. 11(b) is a cross sectional view of color dot 1100 along the A1-A1' cut of FIG. 11(a). FIG. 11(c) is a cross sectional view of color dot 1100 along the B1-B1' cut of FIG. 11(a). As shown in FIGS. 11(b) and 11(c), field reduction layer 1114 has curved sloping sides which form a three-dimensional rectangular solid having a rounded convex depression on top, similar to a hyperboloid. Other embodiments of the present invention may use other shapes for field reduction layers.

Figure 12:
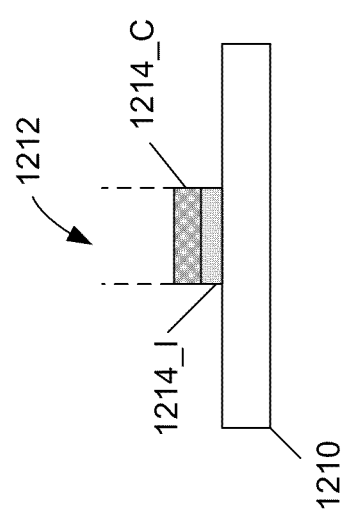
FIG. 12 illustrates a color dot in accordance with one embodiment of the present invention.

FIG. 12 illustrates another embodiment of the present invention in which a field reduction layer 1214 is formed using an insulating layer 1214_I on electrode 1210 and a conducting layer 1214_C on top of insulating layer 1214_I. Conducting layer 1214_C reduces the electric field from electrode 1210 in embedded polarity region 1212. Insulating layer 1214_I isolates conducting layer 1214_C from electrode 1210. A dielectric lateral layer or passivation layer can be used to replace the insulating layer 1214_I, and to reduce the electric field. In another embodiment of the present invention, conducting layer 1214_C is polarized. For example, if electrode 1210 has positive polarity, conducting layer 1214_C is driven to a negative polarity. The interaction from the fields of electrode 1210 and conducting layer 1214 creates lateral forces that can more quickly reorient liquid crystals to their proper position after a physical disturbance. In general, a black matrix layer can be added to prevent the light leakage from the field reduction layer 1214 or 1214_I. Various embodiments of the present invention can have different shapes for conducting layer 1214_C. For example, conducting layer 1214_C could use any of the shapes illustrated in FIGS. 6(a)-(c) to 11(a)-(c) as well as other shapes.

In other embodiment of the present invention, the embedded polarity regions are induced from below the conductor to allow greater uniformity of the interface between the electrodes and the liquid crystal medium. FIGS. 13(a) and 13(b) illustrate a color dot 1300 in accordance with another embodiment of the present invention. Color dot 1300 includes a square shaped electrode 1310 with a square shaped embedded polarity region 1312. FIG. 13(b) is a cross sectional view of color dot 1300 along the A1-A1' cut of FIG. 13(a). As shown in FIG. 13(b), embedded polarity region 1312 is created by an embedded electrode 1316 underneath electrode 1310. Embedded electrode 1316 is separated from electrode 1310 by an insulating layer 1314. Embedded electrode 1316 is electrified to generate an electric field through electrode 1310. In most embodiments of the present invention electrode 1310 and embedded electrode 1316 have opposite polarity directions. For example, when electrode 1310 has positive polarity, embedded electrode 1316 would have a negative polarity. The interaction of the electric field generated by electrode 1310 and embedded electrode 1316 creates lateral forces that can more quickly reorient liquid crystals to their proper position after a physical disturbance.

As shown in FIG. 13(c), the techniques to create embedded polarity regions can be combined. Specifically, in FIG. 13(c), a changed conductive region 1318 is created in electrode 1310 within embedded polarity region 1312. In the embodiment of FIG. 13(c), changed conductive region 1318 is made non-conductive so that the electric field in embedded polarity region 1312 is predominantly controlled by embedded electrode 1316. The interaction of the electric field generated by electrode 1310 and embedded electrode 1316 creates lateral forces that can more quickly reorient liquid crystals to their proper position after a physical disturbance.

Figure 14B:
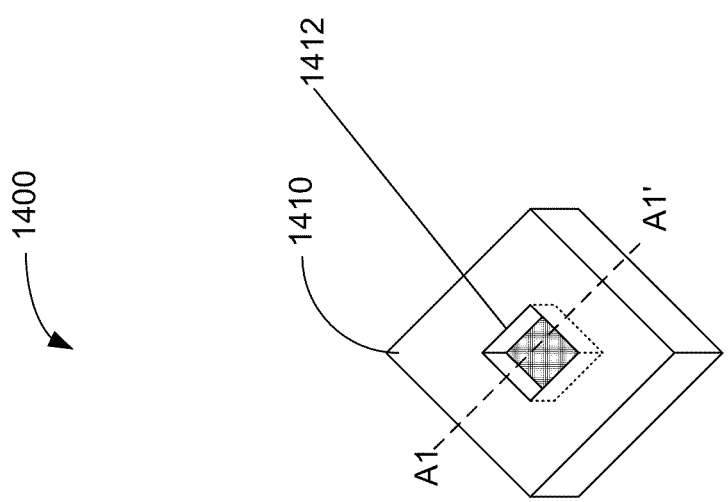
FIGS. 14(a)-14(b) illustrate a color dot in accordance with one embodiment of the present invention.
Figure 14A:
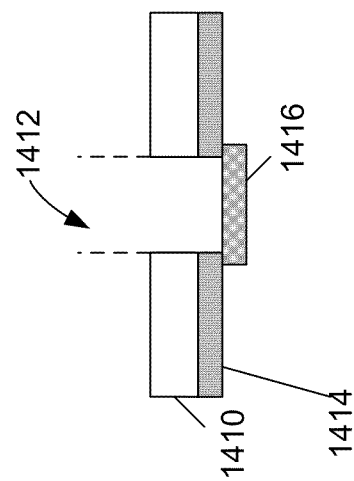

FIGS. 14(a)-14(b) illustrate portions of a color dot 1400 in accordance with another embodiment of the present invention. Color dot 1400 includes a square shaped electrode 1410 with a square shaped embedded polarity region 1412. However, electrode 1410 does not extend into embedded polarity region 1412. In the embodiment of FIG. 14(a), electrode 1410 is etched to create a void in embedded polarity region 1412. In other embodiments of the present invention, electrodes are formed with the voids.

FIG. 14(b) is a cross sectional view of color dot 1400 along the A1-A1' cut of FIG. 14(a). As shown in FIG. 14(b), embedded polarity region 1412 is created by an embedded electrode 1416 underneath electrode 1410. Embedded electrode 1416 is separated from electrode 1410 by an insulating layer 1414. In the embodiment of FIG. 14(b) insulating layer 1414 is etched to create a void in embedded polarity region 1410. In other embodiments, of the present invention, insulating layer 1414 does not include voids. Embedded electrode 1416 is electrified to generate an electric field through the void in electrode 1410. In most embodiments of the present invention electrode 1410 and embedded electrode 1416 have opposite polarity directions. For example, when electrode 1410 has positive polarity, embedded electrode 1416 would have a negative polarity. The interaction of the electric field generated by electrode 1410 and embedded electrode 1416 creates lateral forces that can more quickly reorient liquid crystals to their proper position after a physical disturbance.

Figure 15A:
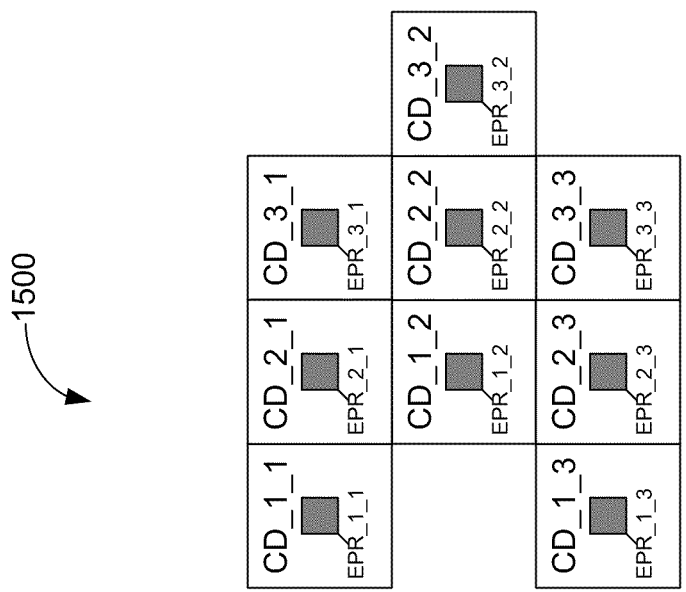
FIGS. 15(a)-15(d) illustrate a pixel design in accordance with one embodiment of the present invention.

As explained above, multiple domains can be created using intrinsic fringe fields. However, intrinsic fringe fields are only applicable on small color dots. Thus, for larger displays pixels are created with color components having many color dots. Each color component is controlled by a separate switching element such as a thin-film transistor (TFT). Generally, the color components are red, green, and blue. In accordance with the present invention, the color components of a pixel are further divided into color dots. FIG. 15(a) illustrates a pixel design using multiple color dots per color component and embedded polarity regions in accordance with one embodiment of the present invention. Specifically, FIG. 15(a) shows a pixel design 1500 which includes three color components. Each of the three color components is further divided into three color dots. For clarity, the color dots are referenced as CD_X_Y, where X is a color component (from 1 to 3) and Y is a dot number (from 1 to 3). Specifically, pixel 1500 is a pixel formed by nine color dots. Each of the color dots include an embedded polarity region at the center of the color dot. The embedded polarity region of a color dot CD_X_Y is labeled EPR_X_Y.

Color dots CD_1_1 (i.e., the first color dot of color component 1), CD_2_1 (i.e., the first color dot of the second color component), and CD_3_1 (i.e., the first color dot of the third color component) form the first row of pixel design 1500. Color dots CD_1_2, CD_2_2, and CD_3_2 form a second row of pixel design 1500. However the second row is offset from the first row so that color dot CD_1_2 is adjacent to color dot CD_2_1. Color dots CD_1_3, CD_2_3, and CD_3_3 form the third row of pixel design 1500. However the third row is aligned with the first row so that color dot CD_2_3 is adjacent to color dot CD_1_2.

Figure 15B:
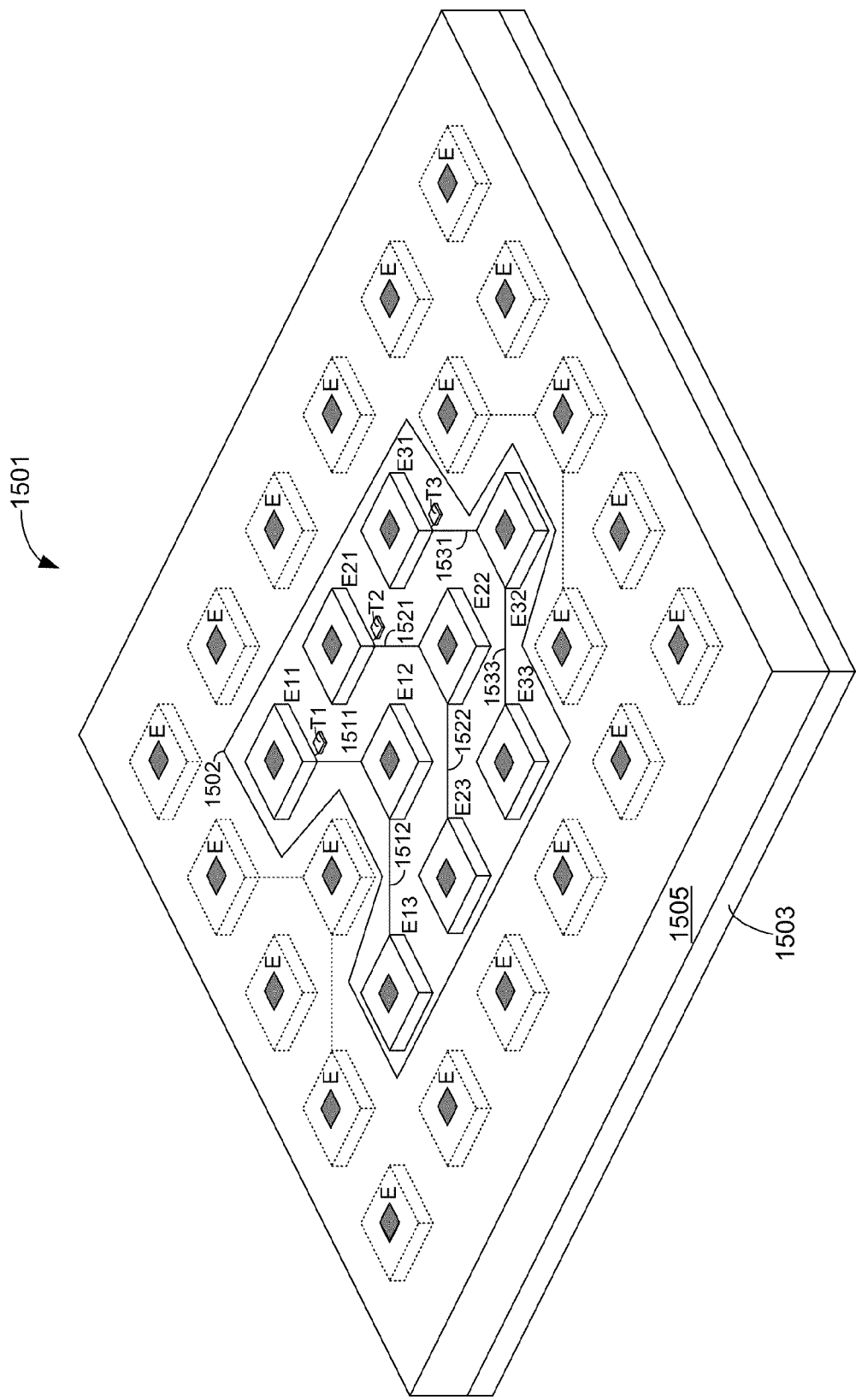

The color dots of a color component are controlled by a switching element, such as a thin-film transistor (TFT), thus the polarity of all the color dots of one color components are the same. Various designs can be used to make the electrical connections between the color dots of a color component. For example, some embodiments of the present invention use ITO connections, which are optically transparent, from the switching element to the color dots. FIG. 15(b) shows a perspective view of a portion of an LCD 1501 with pixel 1502 of pixel design 1500. Specifically, FIG. 15(b) shows a polarizer 1503 attached to a substrate 1505. Electrodes E11, E12, E13, E21, E22, E23, E31, E32, and E33 of pixel 1502 are formed on the top surface of substrate 1505. Various electrodes (E) of other pixels are also formed on substrate 1505. The electrodes include an embedded polarity region (shaded square within each electrode) that can be formed using the various methods discussed above. Due to space constraints the embedded polarity regions are not specifically labeled in FIG. 15(b). For clarity, the electrodes E of other pixels are shown with dotted lines. An alignment layer (not shown) would cover the electrodes. Also shown in FIG. 15(b) are transistors T1, T2, and T3 of Pixel 1502. For clarity the transistors of other pixels are not shown in FIG. 15(b).

Electrodes E11, E12, E13, E21, E22, E23, E31, E32, and E33 correspond with color dots CD_1_1, CD_1_2, CD_1_3, CD_2_1, CD_2_2, CD_2_3, CD_3_1, CD_3_2, and CD_3_3 respectively. As explained above color dots CD_1_1, CD_1_2, and CD_1_3 are electrically connected and electrically controlled and switched by a single switching element such as a thin-film transistor, which is located at color dot CD_1_1. Thus as shown in FIG. 15(b), transistor T1 is coupled to electrode E11 and electrodes E11, E12, and E13 are electrically connected by connectors 1511 and 1512. Connectors 1511 and 1512 are usually formed of a transparent conductive material such as ITO. As explained above, the polarity of the embedded polarity region differs from that of the color dot. Thus, the polarity of the embedded polarity regions EPR_1_1, EPR_1_2, and EPR_1_3 (not labeled in FIG. 15(b)) are controlled by a polarity source different from transistor T1 (which controls the polarity of color dots CD_1_1, CD_1_2, and CD_1_3). For example in one embodiment of the present invention, embedded polarity regions EPR_1_1, EPR_1_2, and EPR_1_3 (not labeled in FIG. 15(b)) are coupled to electrodes E21, E22, and E23, respectively.

Color dots CD_2_1, CD_2_2, and CD_2_3 are electrically connected and electrically controlled and switched by a single switching element, which is located at color dot CD_2_1. Thus as shown in FIG. 15(b), transistor T2 is coupled to electrode E21 and electrodes E21, E22, and E23 are electrically connected by connectors 1521 and 1522. Likewise, Color dots CD_3_1, CD_3_2, and CD_3_3 are electrically connected and electrically controlled and switched by a single switching element, which is located at color dot CD_3_1. Thus as shown in FIG. 15(b), transistor T3 is coupled to electrode E31 and electrodes E31, E32, and E33 are electrically connected by connectors 1531 and 1532.

Figures 15C, 15D:
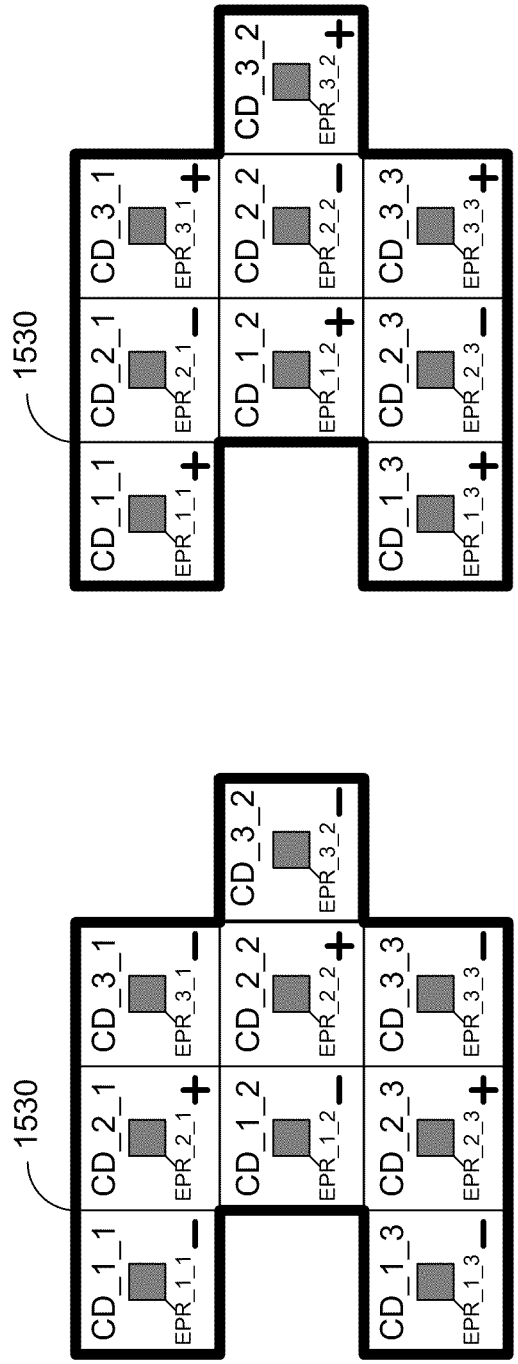

To achieve multiple domains, the first and third color components of a pixel have the same polarity and the second component has the opposite polarity. However for adjacent pixels the polarities are reversed. For MVALCDs using the pixel design of FIG. 15, two different dot polarity patterns are used for the pixels. FIGS. 15(c) and 15(d) illustrate the two dot polarity patterns. In FIG. 15(c), a pixel 1510 using pixel design 1500 is an example of the first dot polarity pattern, which has positive polarity at the second color component, i.e., color dots CD_2_1, CD_2_2, and CD_2_3, and negative polarity at the first and third color components, i.e., CD_1_1, CD_1_2, CD_1_3, CD_3_1, CD_3_2, and CD_3_3. As explained above, the polarity of the embedded polarity region differs from that of the color dot containing the embedded polarity region. Thus, the polarity of the embedded polarity regions are controlled by a polarity source different from the source controlling the polarity of color dots containing the embedded polarity regions.

In FIG. 15(d), pixel 1520 is an example of the second dot polarity pattern, which has negative polarity at the second color component, i.e., color dots CD_2_1, CD_2_2, and CD_2_3, and positive polarity at the first and third color components, i.e., CD_1_1, CD_1_2, CD_1_3, CD_3_1, CD_3_2, and CD_3_3. As explained above, the polarity of the embedded polarity region differs from that of the color dot containing the embedded polarity region. In actual operation a pixel will switch between the first dot polarity pattern and the dot second polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Thus, FIG. 15(c) is the negative dot polarity pattern and FIG. 15(d) is the positive dot polarity pattern for the pixel design of FIG. 15(a).

Figure 15E:
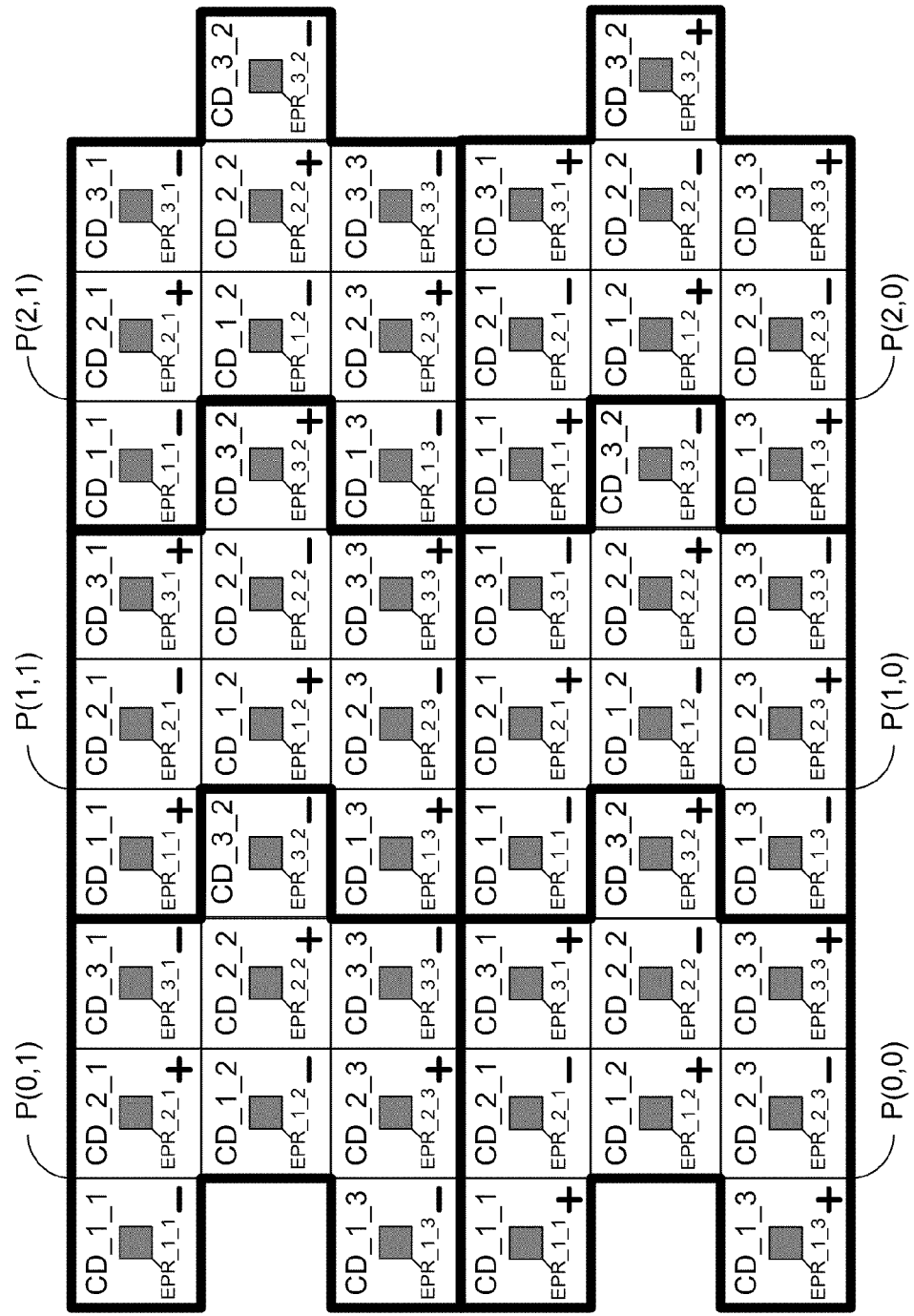
FIG. 15(e) illustrates a portion of a display in accordance with one embodiment of the present invention.

Pixels using the pixel design of FIG. 15(a) can be arranged in a checkerboard pattern with half the pixels having the positive dot polarity pattern and half the pixels having the negative dot polarity pattern. FIG. 15(e) illustrates the checkerboard pattern with pixels P(0, 0), P(1, 0), P(2, 0), P(0, 1), P(1, 1), and P(2, 1). Specifically, as illustrated in FIG. 5(c), a pixel P(x,y) is in the xth column (from the left and the y-th row starting from the bottom, with pixel P(0,0) being the bottom left corner. Pixels P(0, 0), P(2, 0) and P(1, 1) have the positive dot polarity pattern and pixels P(1, 0), P(0, 1), and P(2, 1) have the negative dot polarity pattern. Thus, in general a pixel P(x, y) has the negative dot polarity pattern if x plus y is an odd number. Conversely, pixel P(x, y) has the positive dot polarity pattern if x plus y is an even number. However, at the next frame the pixels will switch dot polarity patterns. Thus, a MVALCD using the pixel design of FIG. 15(a) has a first set of pixels having a first dot polarity pattern and a second set of pixels having a second dot polarity pattern. The first set of pixels and the second set of pixels are arranged in a checkerboard pattern.

Figure 1B:
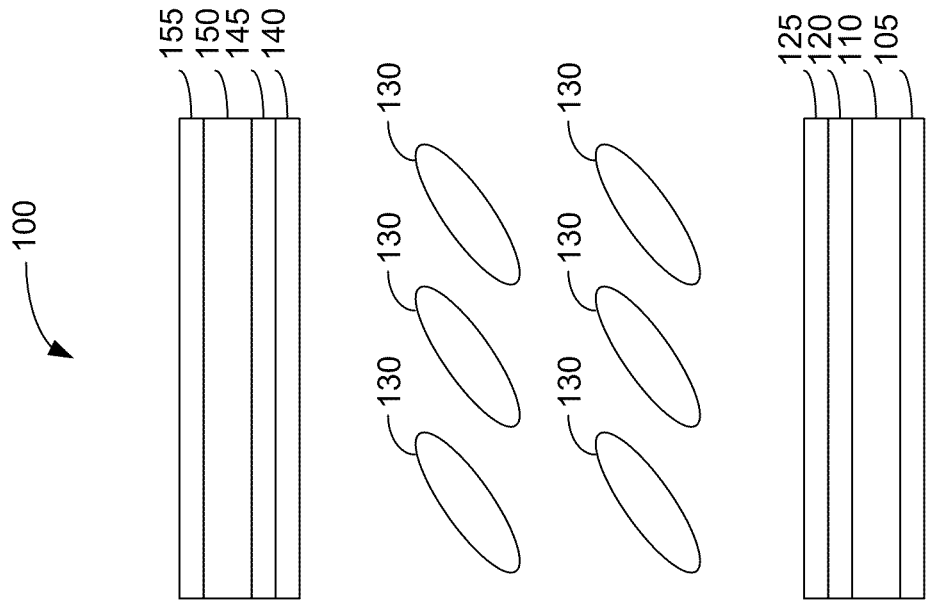
FIGS. 1(a)-1(c) are three illustrations of a pixel of a conventional single domain vertical alignment LCD.
Figure 1A:
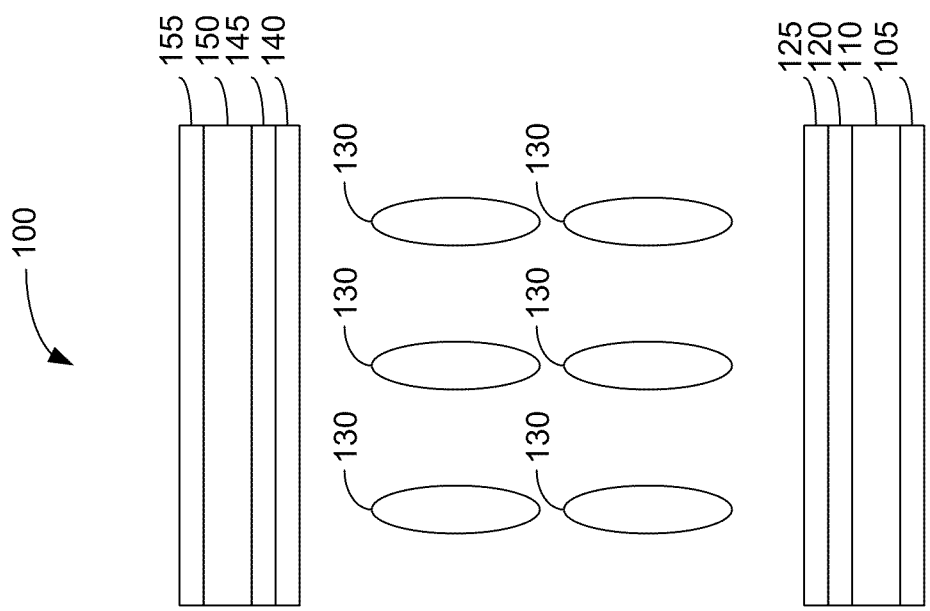
Figure 1C:
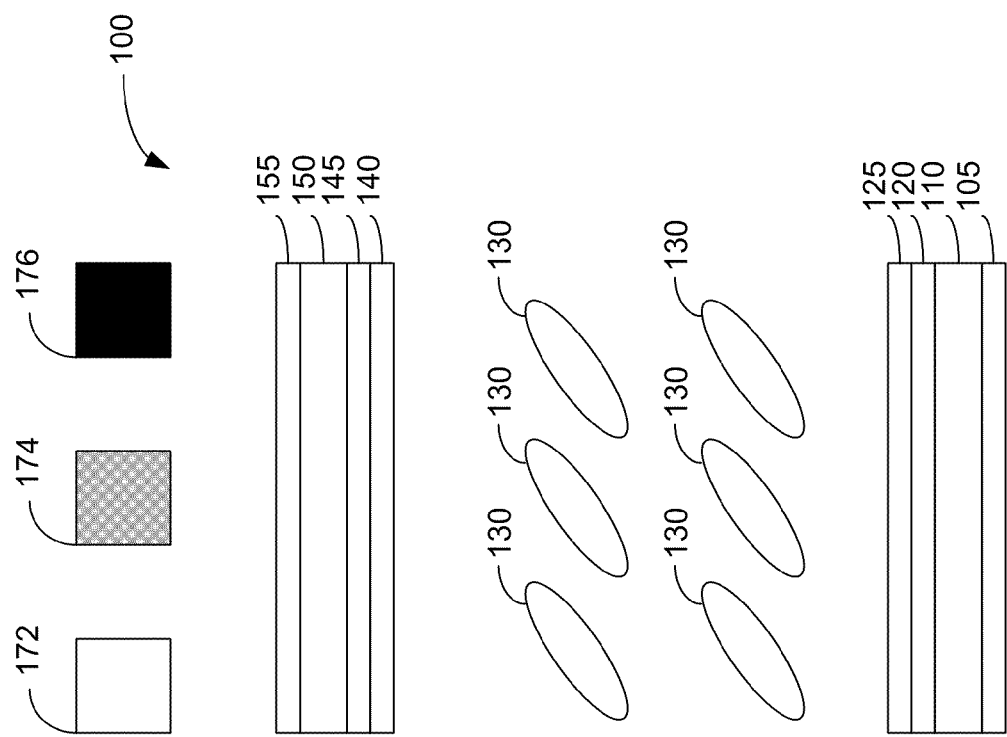
Figure 3A:
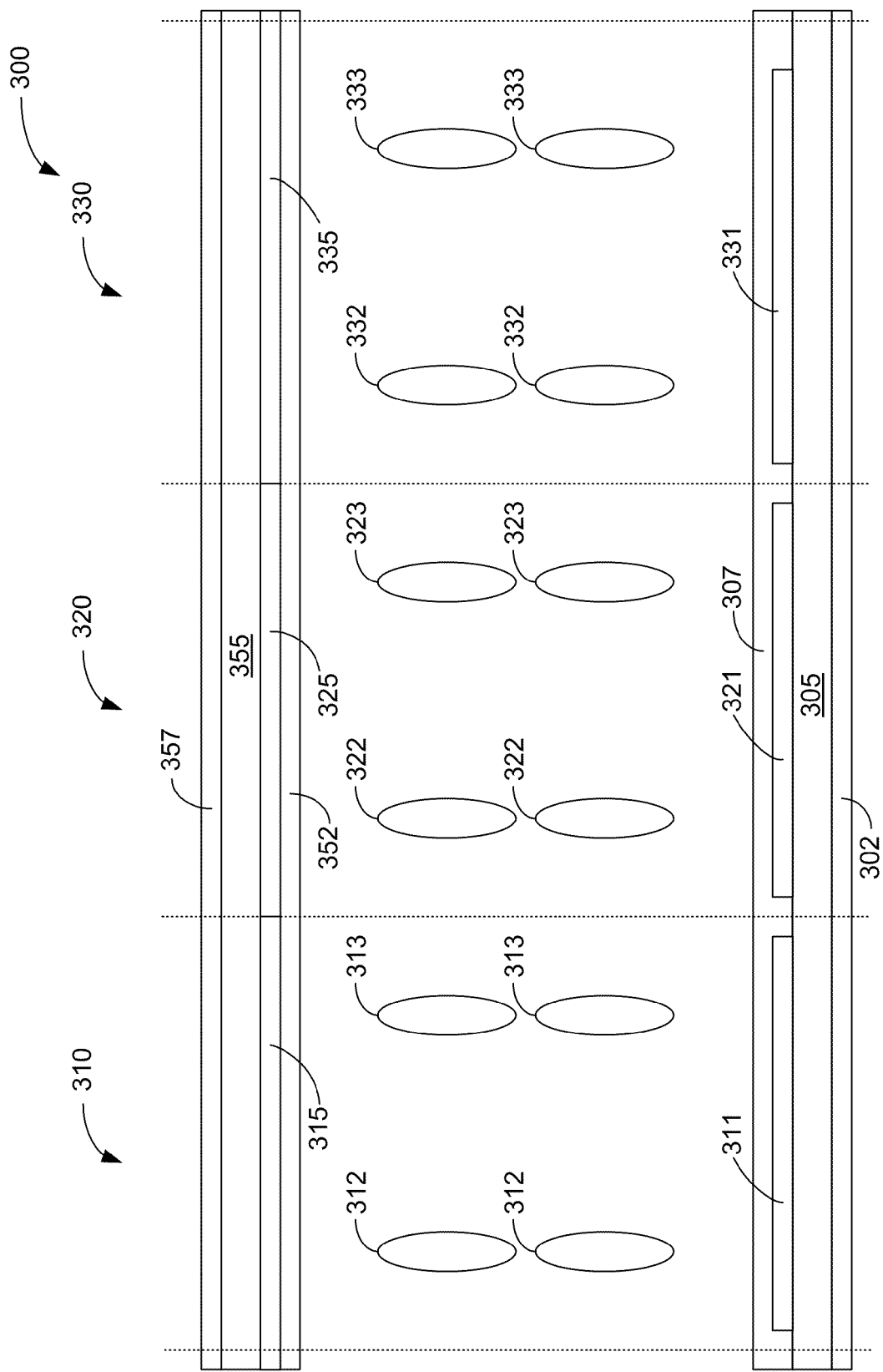
FIGS. 3(a)-3(b) illustrate a multi-domain vertical alignment liquid crystal display in accordance with one embodiment of the present invention.
Figure 3B:
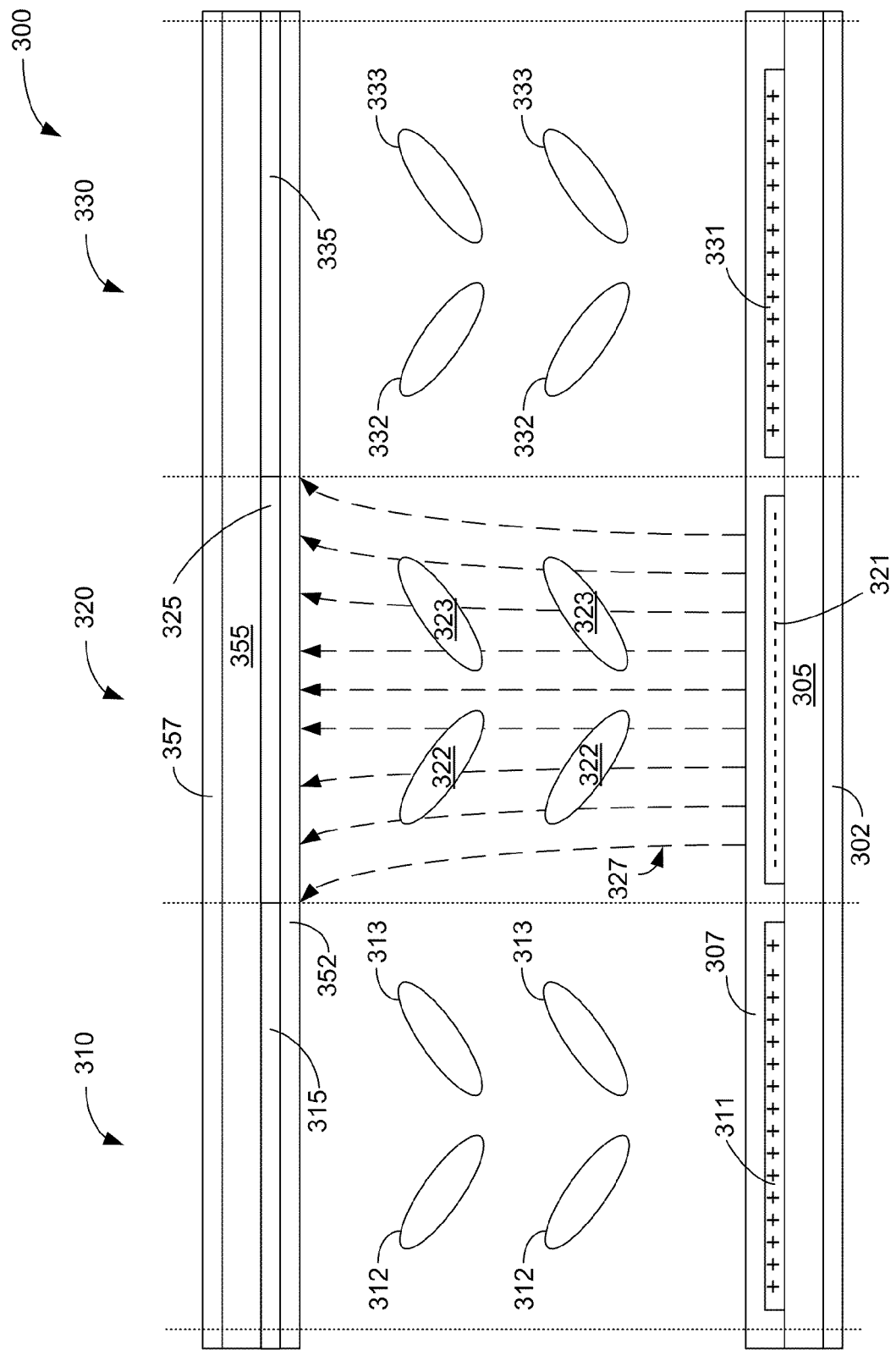

A close examination of FIG. 15(e) reveals that the color dots also have a checkerboard pattern in terms of polarity. Thus, for each color dot of a first polarity, the four adjacent color dots will be of a second polarity. For example, color dot CD_3_1 of pixel P(0, 0), which has a positive polarity, is surrounded by four color dots of negative polarity. Specifically, color dots CD_3_3 of pixel P(0, 1), color dot CD_1_1, of pixel P(1, 0), and color dots CD_2_1 and CD_2_2 of pixel P(0, 0). As explained above, polarity inversion between neighboring color dots enhances the fringe field of the color dots. Because the color dots are quite small, fringe fields from the color dots will cause multiple domains in the liquid crystals of each color dot under the principles explained above with respect to FIGS. 3(a) and 3(b).

Figures 16A, 16B:
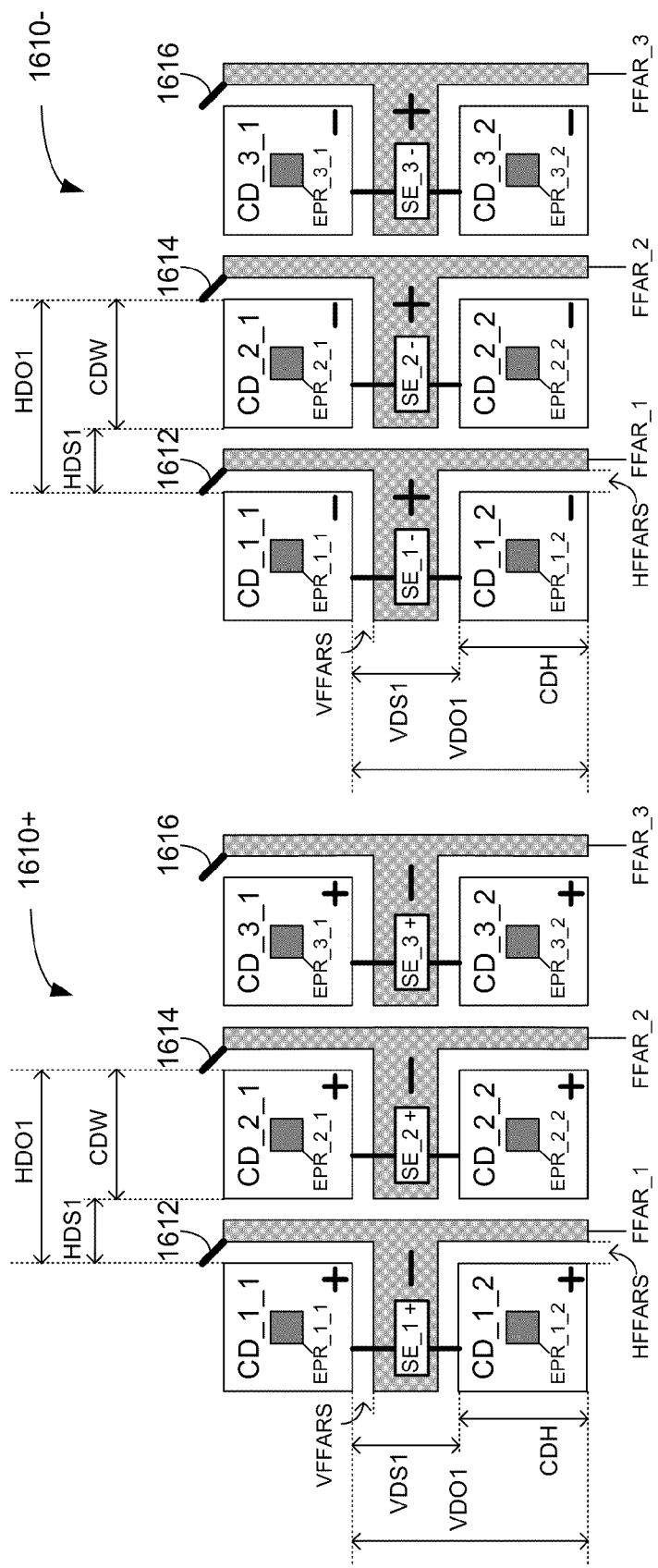

FIG. 16(a)-16(b) shows another pixel design having multiple color dots per color component that incorporate embedded polarity regions in accordance with the present invention. Specifically, FIGS. 16(a) and 16(b) show different dot polarity patterns of a pixel design 1610 (labeled 1610+ and 1610− as described below) that is often used in displays having a switching element row inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 16(a), pixel design 1610 has a positive dot polarity pattern (and is thus labeled 1610+) and in FIG. 16(b), pixel design 1610 has a negative dot polarity pattern (and is thus labeled 1610−). Furthermore, the polarity of each polarized component in the various pixel designs are indicated with "+" for positive polarity or "−" for negative polarity.

Pixel design 1610 has three color components CC_1, CC_2 and CC_3 (not labeled in FIGS. 16(a)-16(b)). Each of the three color components includes two color dots. For clarity, the color dots are referenced as CD_X_Y, where X is a color component (from 1 to 3 in FIGS. 16(a)-16(b)) and Y is a dot number (from 1 to 2 in FIGS. 16(a)-16(b)). Pixel design 1610 also includes a switching element for each color component (referenced as SE_1, SE_2, and SE_3) and a fringe field amplifying region for each color component (referenced as FFAR_1, FFAR_2, and FFAR_3). Switching elements SE_1, SE_2, and SE_3 are arranged in a row. Device component areas around each switching element are covered by the fringe field amplifying regions and are thus not specifically labeled in FIGS. 16(a) and 16(b). Fringe field amplifying regions FFAR_1, FFAR_2, and FFAR_3 are also arranged in a row and described in more detail in FIG. 16(c).

First color component CC_1 of pixel design 1610 has two color dots CD_1_1 and CD_1_2. Color dots CD_1_1 and CD_1_2 form a column and are separated by a vertical dot pacing VDS1. In other words, color dots CD_1_1 and CD_1_2 are horizontally aligned and vertically separated by vertical dot spacing VDS1. Furthermore, color dots CD_1_1 and CD_1_2 are vertically offset by vertical dot offset VDO1 which is equal to vertical dot spacing VDS1 plus the color dot height CDH. Switching element SE_1 is located in between color dots CD_1_1 and CD_1_2 so that color dot CD_1_1 is on a first side of the row of switching elements and color dot CD_1_2 is on a second side of the row of switching elements. Switching element SE_1 is coupled to the electrodes of color dots CD_1_1 and CD_1_2 to control the voltage polarity and voltage magnitude of color dots CD_1_1 and CD_1_2.

Each color dot of color component CD_1_1 includes an embedded polarity region which would minimize any touch mura effects in the color dot. Specifically, color dots CD_1_1 and CD_1_2 include embedded polarity regions EPR_1_1 and EPR_1_2, respectively. As shown in FIG. 16(a), embedded polarity regions EPR_1_1 and EPR_1_2 are centered within color dots CD_1_1 and CD_1_2, respectively. Any of the various techniques used to form embedded polarity regions described herein can be used with pixel design 1610. In a particular embodiment of the present invention, the techniques illustrated in FIGS. 14(a)-(b) are used. However, other embodiments of the present invention can use other techniques to form embedded polarity regions, can include multiple embedded polarity regions, or can offset the embedded polarity region.

As explained above, the polarity of the embedded polarity region differs from that of the color dot. Thus, the polarity of the embedded polarity regions EPR_1_1 and EPR_1_2 are controlled by a polarity source different from switching element SE_1 (which controls the polarity of color dots CD_1_1 and CD_1_2). In some embodiments of the present invention, a display includes dedicated embedded-polarity-region switching elements to control the polarity of the embedded polarity regions (See FIG. 16(d) for one such embodiment). Other embodiments of the present invention, may couple the embedded polarity regions to other elements of the pixel that have a differing polarity. For example, in some embodiments of the present invention, embedded polarity regions CD_1_1 and CD_1_2 are coupled to fringe field amplifying region FFAR_1, which is described below.

Similarly, second color component CC_2 of pixel design 410 has two color dots CD_2_1 and CD_2_2. Color dots CD_2_1 and CD_2_2 form a second column and are separated by a vertical dot spacing VDS1. Thus, color dots CD_2_1 and CD_2_2 are horizontally aligned and vertically separated by vertical dot spacing VDS1. Switching element SE_2 is located in between color dots CD_2_1 and CD_2_2 so that color dot CD_2_1 is on the first side of the row of switching elements and color dot CD_2_2 is on a second side of the row of switching elements. Switching element SE_2 is coupled to the electrodes of color dots CD_2_1 and CD_2_2 to control the voltage polarity and voltage magnitude of color dots CD_2_1 and CD_2_2. Second color component CC_2 is vertically aligned with first color component CC_1 and separated from color component CC_1 by a horizontal dot spacing HDS1, thus color components CC_2 and CC_1 are horizontally offset by a horizontal dot offset HDO1, which is equal to horizontal dot spacing HDS1 plus the color dot width CDW. Specifically with regards to the color dots, color dot CD_2_1 is vertically aligned with color dots CD_1_1 and horizontally separated by horizontal dot spacing HDS1. Similarly, color dot CD_2_2 is vertically aligned with color dots CD_2_1 and horizontally separated by horizontal dot spacing HDS1. Thus color dot CD_1_1 and color dot CD_2_1 form a first row of color dots and color dot CD_1_2 and color dot CD_2_2 form a second row of color dots. Like color dots CD_1_1 and CD_1_2, Color dots CD_2_1 and CD_2_2 include embedded polarity regions EPR_2_1 and EPR_2_2, respectively.

Similarly, third color component CC_3 of pixel design 410 has two color dots CD_3_1 and CD_3_2. Color dots CD_3_1 and CD_3_2 form a third column and are separated by a vertical dot spacing VDS1. Thus, color dots CD_3_1 and CD_3_2 are horizontally aligned and vertically separated by vertical dot spacing VDS1. Switching element SE_3 is located in between color dots CD_3_1 and CD_3_2 so that color dot CD_3_1 is on the first side of the row of switching elements and color dot CD_3_2 is on a second side of the row of switching elements. Switching element SE_3 is coupled to the electrodes of color dots CD_3_1 and CD_3_2 to control the voltage polarity and voltage magnitude of color dots CD_3_1 and CD_3_2. Third color component CC_3 is vertically aligned with second color component CC_2 and separated from color component CC_2 by horizontal dot spacing HDS1, thus color components CC_3 and CC_2 are horizontally offset by a horizontal dot offset HDO1. Specifically with regards to the color dots, color dot CD_3_1 is vertically aligned with color dots CD_2_1 and horizontally separated by horizontal dot spacing HDS1. Similarly, color dot CD_3_2 is vertically aligned with color dots CD_2_2 and horizontally separated by horizontal dot spacing HDS1. Thus color dot CD_3_1 is on the first row of color dots and color dot CD_3_2 is on the second row of color dots. Like color dots CD_1_1 and CD_1_2, Color dots CD_3_1 and CD_3_2 include embedded polarity regions EPR_3_1 and EPR_3_2, respectively.

For clarity, the color dots of pixel design 1610 are illustrated with color dots having the same color dot height CDH. However, some embodiments of the present invention may have color dots with different color dot heights. For example in one embodiment of the present invention that is a variant of pixel design 1610, color dots CD_1_1, CD_2_1 and CD_3_1 have a smaller color dot height than color dots CD_1_2, CD_2_2, and CD_3_2.

Pixel design 1610 also includes fringe field amplifying regions FFAR_1, FFAR_2, and FFAR_3. FIG. 16(c) shows a more detailed view of fringe field amplifying region FFAR_1 of pixel design 1610. For clarity fringe field amplifying regions FFAR_1 is conceptually divided into a vertical amplifying portion VAP and a horizontal amplifying portion HAP. In FIG. 16(c) horizontal amplifying portion HAP is vertically centered on and extends to the left of vertical amplifying portion VAP. Use of horizontal amplifying portions and vertical amplifying portions allows clearer description of the placement of fringe field amplifying region FFAR1. In most embodiments of the present invention, the electrodes of the fringe field amplifying regions are formed by one contiguous conductor. Horizontal amplifying portion HAP has a horizontal amplifying portion width HAP_W and a horizontal amplifying portion height HAP_H. Similarly, vertical amplifying portion VAP has a vertical amplifying portion width VAP_W and a vertical amplifying portion height HAP_H. Fringe field amplifying regions FFAR_2 and FFAR_3 have the same shape as fringe field amplifying region FFAR_1. In embodiments of the present invention having different sized color dots, horizontal amplifying region HAP would be located in between the color dots rather than centered on vertical amplifying portion VAP.

As shown in FIG. 16(a), fringe field amplifying regions FFAR_1, FFAR_2, and FFAR_3 are placed in between the color dots of pixel design 1610. Specifically, fringe field amplifying region FFAR_1 is placed so that the horizontal amplifying portion of fringe field amplifying region FFAR_1 lies in between color dots CD_1_1 and CD_1_2 and is separated from color dots CD_1_1 and CD_1_2 by a vertical fringe field amplifying region spacing VFFARS. The vertical amplifying portion of fringe field amplifying region FFAR_1 is placed to the right of color dots CD_1_1 and CD_1_2 and is separated from color dots CD_1_1 and CD_1_2 by a horizontal fringe field amplifying region spacing HFFARS. Thus, fringe field amplifying region FFAR_1 extends along the bottom and the right side of color dot CD_1_1 and along the top and right side of color dot CD_1_2. Furthermore, this placement also causes the vertical amplifying portion of fringe field amplifying region FFAR_1 to be in between color dots CD_1_1 and CD_2_1 and in between color dots CD_1_2 and CD_2_2.

Similarly, fringe field amplifying region FFAR_2 is placed so that the horizontal amplifying portion of fringe field amplifying region FFAR_2 lies in between color dots CD_2_1 and CD_2_2 and is separated from color dots CD_2_1 and CD_2_2 by a vertical fringe field amplifying region spacing VFFARS. The vertical amplifying portion of fringe field amplifying region FFAR_2 is placed to the right of color dots CD_2_1 and CD_2_2 and is separated from color dots CD_2_1 and CD_2_2 by a horizontal fringe field amplifying region spacing HFFARS. Thus, fringe field amplifying region FFAR_1 extends along the bottom and the right side of color dot CD_2_1 and along the top and right side of color dot CD_2_2. This placement also causes the vertical amplifying portion of fringe field amplifying region FFAR_2 to be in between color dots CD_2_1 and CD_3_1 and in between color dots CD_2_2 and CD_3_2.

Fringe field amplifying region FFAR_3 is placed so that the horizontal amplifying portion of fringe field amplifying region FFAR_3 lies in between color dots CD_3_1 and CD_3_2 and is separated from color dots CD_3_1 and CD_3_2 by a vertical fringe field amplifying region spacing VFFARS. The vertical amplifying portion of fringe field amplifying region FFAR_3 is placed to the right of color dots CD_3_1 and CD_3_2 and is separated from color dots CD_3_1 and CD_3_2 by a horizontal fringe field amplifying region spacing HFFARS. Thus, fringe field amplifying region FFAR_3 extends along the bottom and the right side of color dot CD_3_1 and along the top and right side of color dot CD_3_2.

The polarities of the color dots, fringe field amplifying regions, and switching elements are shown using "+" and "−" signs. Thus, in FIG. 16(a), which shows the positive dot polarity pattern of pixel design 1610+, all the switching elements (i.e. switching elements SE_1, SE_2, and SE_3); all the color dots (i.e. color dots CD_1_1, CD_1_2, CD_2_1, CD_2_2, CD_3_1, and 3_2) have positive polarity. However, all the fringe field amplifying regions (i.e. fringe field amplifying regions FFAR_1, FFAR_2, and FFAR_3) have negative polarity. As explained above, Embedded polarity regions may have the same direction of polarity (i.e. positive or negative) as the color dot but have a different magnitude of polarity. Alternatively, embedded polarity regions may have different polarity (i.e. "direction of polarity") than the color dot (e.g. positive polarity for color dot polarity with negative polarity for embedded polarity regions). In addition, embedded polarity regions can have neutral polarity. In a particular embodiment of the present invention, the embedded polarity regions of pixel design 1610 have different polarity than the color dots. Thus for this embodiment, embedded polarity regions EPR_1_1, EPR_1_2, EPR_2_1, EPR_2_2, EPR_3_1, and EPR_3_2 would have negative polarity in FIG. 16(a).

FIG. 16(b) shows pixel design 1610 with the negative dot polarity pattern. For the negative dot polarity pattern, all the switching elements (i.e. switching elements SE_1, SE_2, and SE_3) and all the color dots (i.e. color dots CD_1_1, CD_1_2, CD_2_1, CD_2_2, CD_3_1, and 3_2) have negative polarity. However, all the fringe field amplifying regions (i.e. fringe field amplifying regions FFAR_1, FFAR_2, and FFAR_3) have positive polarity. In the particular embodiment of the present invention in which the embedded polarity regions of pixel design 1610 has different polarity than the color dots, embedded polarity regions EPR_1_1, EPR_1_2, EPR_2_1, EPR_2_2, EPR_3_1, and EPR_3_2 would have positive polarity in FIG. 16(b).

Fringe fields in each of the color dots are amplified if adjacent components have opposite polarities. Pixel design 1610 makes use of the fringe field amplifying regions to enhance and stabilize the formation of multiple domain in the liquid crystal structure. In general, the polarities of the polarized components are assigned so that a color dot of a first polarity has neighboring polarized components of the second polarity. For example for the positive dot polarity pattern of pixel design 1610 (FIG. 16(a)), color dot CD_2_2 has positive polarity. However the neighboring polarized components (fringe field amplifying regions FFAR_2 and FFAR_1) have negative polarity. Thus, the fringe field of color dot CD_2_2 is amplified. Furthermore, as explained below, the polarity reversing scheme is carried out at the display level as well so that the color dot of another pixel that is placed next to color dot CD_1_2 would have negative polarity (see FIG. 16(d)).

Because, all the switching elements in pixel design 1610 have the same polarity and the fringe field amplifying regions require the opposite polarity, the fringe field amplifying regions are driven by an external polarity source, i.e. a polarity source from outside the specific pixel of pixel design 1610. Various sources of opposite polarity can be used in accordance with differing embodiments of the present invention. For example specific fringe field amplifying region switching elements may be used or switching elements of nearby pixels having an opposite dot polarity could also used to drive the fringe field amplifying regions. In the embodiments of FIGS. 16(a)-16(b), switching elements of nearby pixels having an opposite dot polarity could also used to drive the fringe field amplifying regions. Therefore, pixel design 1610 includes conductor to facilitate coupling the fringe field amplifying regions to switching elements in other pixels. Specifically, a conductor 1612 of a current pixel would couple the electrode of fringe field amplifying region FFAR_1 to switching element SE_1 (see FIGS. 16(d) and 16(e)) of a pixel above the current pixel. The connection to the switching element would be via the electrodes of the color dots of the pixel above the current pixel. Similarly, a conductor 1614 of a current pixel would couple the electrode of fringe field amplifying region FFAR_2 to switching element SE_2 (see FIG. 16(d)) of a pixel above the current pixel. The connection to the switching element would be via the electrodes of the color dots of the pixel above the current pixel. A conductor 1616 of a current pixel would couple the electrode of fringe field amplifying region FFAR_3 to switching element SE_3 (see FIGS. 16(d) and 16(e)) of a pixel above the current pixel. The connection to the switching element would be via the electrodes of the color dots of the pixel above the current pixel.

Figure 16D:
FIG. 16(d) illustrates a portion of a display in accordance with one embodiment of the present invention.
Figure 16E:
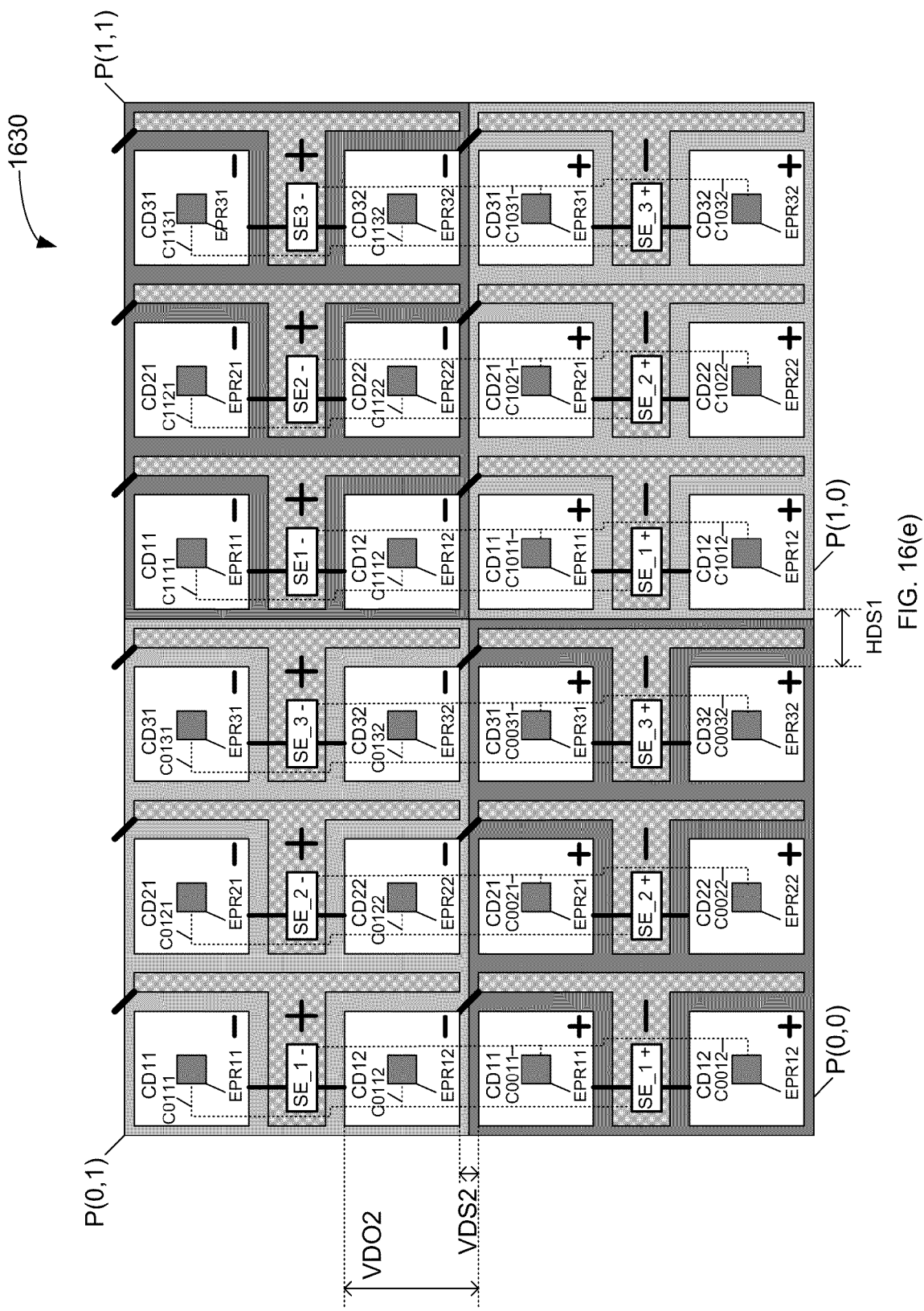
FIG. 16(e) illustrates a portion of a display in accordance with one embodiment of the present invention.

These connections are better shown in FIG. 16(d), which shows a portion of display 1620 using pixels P(0, 0), P(1, 0), P(0, 1), and P(1, 1) of pixel design 1610 with a switching element row inversion driving scheme. Display 1620 could have thousands of rows with thousand of pixels on each row. The rows and columns would continue from the portion shown in FIG. 16(d) in the manner shown in FIG. 16(d). For clarity, the gate lines and source lines that control the switching elements are omitted in FIG. 16(d). Furthermore, to better illustrate each pixel, the area of each pixel is shaded; this shading is only for illustrative purposes in FIG. 16(d) and has no functional significance. The pixels of display 1620 are arranged so that all pixels in a row have the same dot polarity pattern (positive or negative) and each successive row should alternate between positive and negative dot polarity pattern. Thus, pixels P(0, 0) and P(1, 0) in the first row (i.e. row 0) have positive dot polarity pattern and pixels P(0, 1) and P(1, 1) in the second row (i.e. row 1) have the negative dot polarity pattern. However, at the next frame the pixels will switch dot polarity patterns. Thus in general a pixel P(x, y) has a first dot polarity pattern when y is even and a second dot polarity pattern when y is odd. Internal conductors 1612, 1614, and 1616 in pixel design 1610, provide polarity to the fringe field amplifying regions. Specifically, fringe field amplifying regions of a first pixel receive voltage polarity and voltage magnitude from a second pixel. Specifically, the second pixel is the pixel above the first pixel. For example, the electrodes of fringe field amplifying region FFAR_1 of pixel P(0, 0) is coupled to switching elements SE_1 of pixel P(0, 1) via the electrodes of color dots CD_1_2 of pixel P(0, 1). Similarly, the electrodes of fringe field amplifying regions FFAR_2 and FFAR_3 of pixel P(0, 0) are coupled to switching elements SE_2, and SE_3 of pixel P(0, 1) via color dots CD_2_2, and CD_3_2 of pixel P(0, 1), respectively.

Display 1620 also includes embedded-polarity-region switching elements EPR_SE_X_Y, for each row of embedded polarity regions. In FIG. 16(*d*), "X" represents the row number of the pixel, and "Y" represents the row number of embedded polarity regions within a pixel. Thus, embedded-polarity-region switching elements EPR_SE_0_1 and EPR_SE_0_2 are used for the pixels in row 0 (i.e. pixel P(0, 0) and pixel P(1, 0)). Specifically, embedded-polarity-region switching element EPR_SE_0_1 is coupled to embedded polarity regions EPR_1_1, EPR_2_1, and EPR_3_1 of pixel P(0,0) and to embedded polarity regions EPR_1_1, EPR_2_1, and EPR_3_1 of pixel P(1, 0). Embedded-polarity-region switching element EPR_SE_0_2 is coupled to embedded polarity regions EPR_1_2, EPR_2_2, and EPR_3_2 of pixel P(0, 0) and to embedded polarity regions EPR_1_2, EPR_2_2, and EPR_3_2 of pixel P(1, 0). Likewise, embedded-polarity-region switching elements EPR_SE_1_1 and EPR_SE_1_2 are used for the pixels in row 1 (i.e. pixel P(0, 1) and pixel P(1, 1)). Specifically, embedded-polarity-region switching element EPR_SE_1_1 is coupled to embedded polarity regions EPR_1_1, EPR_2_1, and EPR_3_1 of pixel P(0, 1) and to embedded polarity regions EPR_1_1, EPR_2_1, and EPR_3_1 of pixel P(1, 1). Embedded-polarity-region switching element EPR_SE_1_2 is coupled to embedded polarity regions EPR_1_2, EPR_2_2, and EPR_3_2 of pixel P(0, 1) and to embedded polarity regions EPR_1_2, EPR_2_2, and EPR_3_2 of pixel P(1, 1). Generally, an embedded-polarity-region switching element would have different polarity as compared to the switching elements in the pixel corresponding to the embedded-polarity-region switching element. Thus, in FIG. 16(*d*), embedded-polarity-region switching elements EPR_SE_0_1 and EPR_SE_0_2 would have negative polarity. Conversely, embedded-polarity-region switching elements EPR_SE_1_1 and EPR_SE_1_2 would have positive polarity. In some embodiments of the present invention, the embedded-polarity-region switching elements would be placed in a more balanced manner. For example, in a particular embodiment of the present invention, half of the embedded-polarity-region switching elements are placed on the right side of the display and half of the embedded-polarity-region switching elements are placed on the left side of the display.

Due to the switching of polarities on each row in display 1620, if a color dot has the first polarity, any neighboring polarized components and embedded polarity regions would have the second polarity. For example, color dot CD_3_2 of pixel P(0, 1) has negative polarity while, embedded polarity region EPR_3_2 of pixel P(0, 1), color dot CD_3_1 of pixel P(0, 0), fringe field amplifying regions FFAR_2 and FFAR_3 of pixel P(0, 1) have positive polarity. In a particular embodiment of the present invention, each color dot has a width of 40 micrometers and a height of 60 micrometers. Each embedded polarity region has a width of 10 micrometers and a height of 10 micrometers Each fringe field amplifying region has a vertical amplifying portion width of 5 micrometers, a vertical amplifying portion height of 145 micrometers, a horizontal amplifying portion width of 50 micrometers, a horizontal amplifying height of 5 micrometers. Horizontal dot spacing HDS1 is 15 micrometers, vertical dot spacing VDS1 is 25 micrometers, horizontal fringe field amplifying spacing HFFARS is 5 micrometers, and vertical fringe field amplifying spacing VFFARS is 5 micrometers.

In another embodiment of the present invention, embedded polarity regions are polarized using switching elements of nearby pixels rather than having dedicated embedded polarity switching elements. FIG. 16(*e*) shows a portion of a display 1630 using pixels P(0, 0), P(1, 0), P(0, 1), and P(1, 1) of pixel design 1610 with a switching element row inversion driving scheme. Display 1630 could have thousands of rows with thousand of pixels on each row. The rows and columns would continue from the portion shown in FIG. 16(*e*) in the manner shown in FIG. 16(*e*). For clarity, the gate lines and source lines that control the switching elements are omitted in FIG. 16(*e*). Furthermore, to better illustrate each pixel, the area of each pixel is shaded; this shading is only for illustrative purposes in FIG. 16(*e*) and has no functional significance. Due to space limitations color dots are labeled as CDXY as opposed to CD_X_Y and embedded polarity regions are labeled as EPRXY as opposed to EPR_X_Y.

Because display 1630 and display 1620 are very similar only the differences are described in detail. For example, the pixels of display 1630 are arranged in the same manner as the pixels of display 1620. Furthermore, the polarity of the color dots, switching elements and fringe field amplifying regions are the same. Thus like in display 1620, a pixel P(x, y) in display 1630 also has a first dot polarity pattern when y is even and a second dot polarity pattern when y is odd. The primary difference between display 1620 and display 1630 is that the polarity for the embedded polarized regions in display 1630 is provided from the switching elements of nearby pixels rather than from dedicated embedded polarity switching elements which were used in display 1620.

In display 1630, a first pixel is paired with a second pixel, so that the embedded polarity regions of the first pixel is coupled to the switching element of the second pixel and the embedded polarity regions of the second pixel is coupled to the switching elements of the first pixel. Specifically, pixels on even numbered rows are paired with the pixel in the odd numbered row above the even numbered row. Thus in FIG. 16(*e*), pixel P(0,0) is paired with Pixel P(0,1) and pixel P(1,0) is paired with pixel P(1,1). In general, a pixel P(X,Y) is paired with a pixel P(X, Y+1) if Y is even. Conversely, a pixel P(x, Y) is paired with pixel P(X, Y–1) if Y is odd.

As illustrated in FIG. 16(*e*), in display 1630 each embedded polarity regions is coupled to a switching element of paired pixel by a conductor C_I_J_X_Y (labeled with CIJXY in FIG. 16(*e*) due to space constraints), where I, J denotes the pixel (e.g. pixel P(I, J) containing the embedded polarity region, X is the color component, and Y denotes the color dot (e.g. color dot CD_X_Y (shortened in FIG. 16(*e*) as CDXY)) within the pixel. For example, conductor C0112 couples embedded polarity region EPR12 of pixel P(0,1) to switching element SE_1 of pixel P(0, 0). The conductors for the embedded polarity regions are shown with dashed lines to indicate that the conductors are in a different plane from the color dots. Typically, the color dots are formed with ITO in a first plane and the conductors are formed with a metal layer in a second plane.

As explained above in pixels on odd numbered rows, embedded polarity elements of a first pixel are coupled to switching elements of the pixel below the first pixel. For example, embedded polarity region EPR_2_2 (labeled EPR22 in FIG. 16(*e*)) of pixel P(0, 1) is coupled to switching element SE_2 of pixel P(0, 0) by conductor C_0_1_2_2 (labeled C0122 in FIG. 16(*e*)). Similarly, embedded polarity region EPR_2_1 (labeled EPR21 in FIG. 16(*e*)) of pixel P(0, 1) is coupled to switching element SE_2 of pixel P(0, 0) by conductor C_0_1_2_1 (labeled C0121 in FIG. 16(*e*)). In general, a conductor C_I_J_X_Y, couples embedded polarity region EPR_X_Y of a pixel P(I, J) to switching element SE_X of pixel P(I, J–1), when J is an odd number.

In pixels on even numbered rows, embedded polarity elements of a first pixel are coupled to switching elements of the pixel above the first pixel. For example, embedded polarity region EPR_2_2 (labeled EPR22 in FIG. 16(e)) of pixel P(0, 0) is coupled to switching element SE_2 of pixel P(0, 1) by conductor C_0_0_2_2 (labeled C0022 in FIG. 16(e)). Similarly, embedded polarity region EPR_2_1 (labeled EPR21 in FIG. 16(e)) of pixel P(0, 0) is coupled to switching element SE_2 of pixel P(0, 1) by conductor C_0_0_2_1 (labeled C0021 in FIG. 16(e)). In general, a conductor C_I_J_X_Y, couples embedded polarity region EPR_X_Y of a pixel P(I, J) to switching element SE_X of pixel P(I, J+1), when J is an even number.

As explained above adjacent row of pixels have opposite polarity in display 1630. Thus, providing polarity from switching elements in pixels from adjacent rows to embedded polarity regions as described above causes the polarity of the embedded polarity regions to be different from the polarity of the color dot. This differing polarity serves to enhance the fringe field in the color dots and reduce the touch mura effect in display 1630.

Figure 16F:
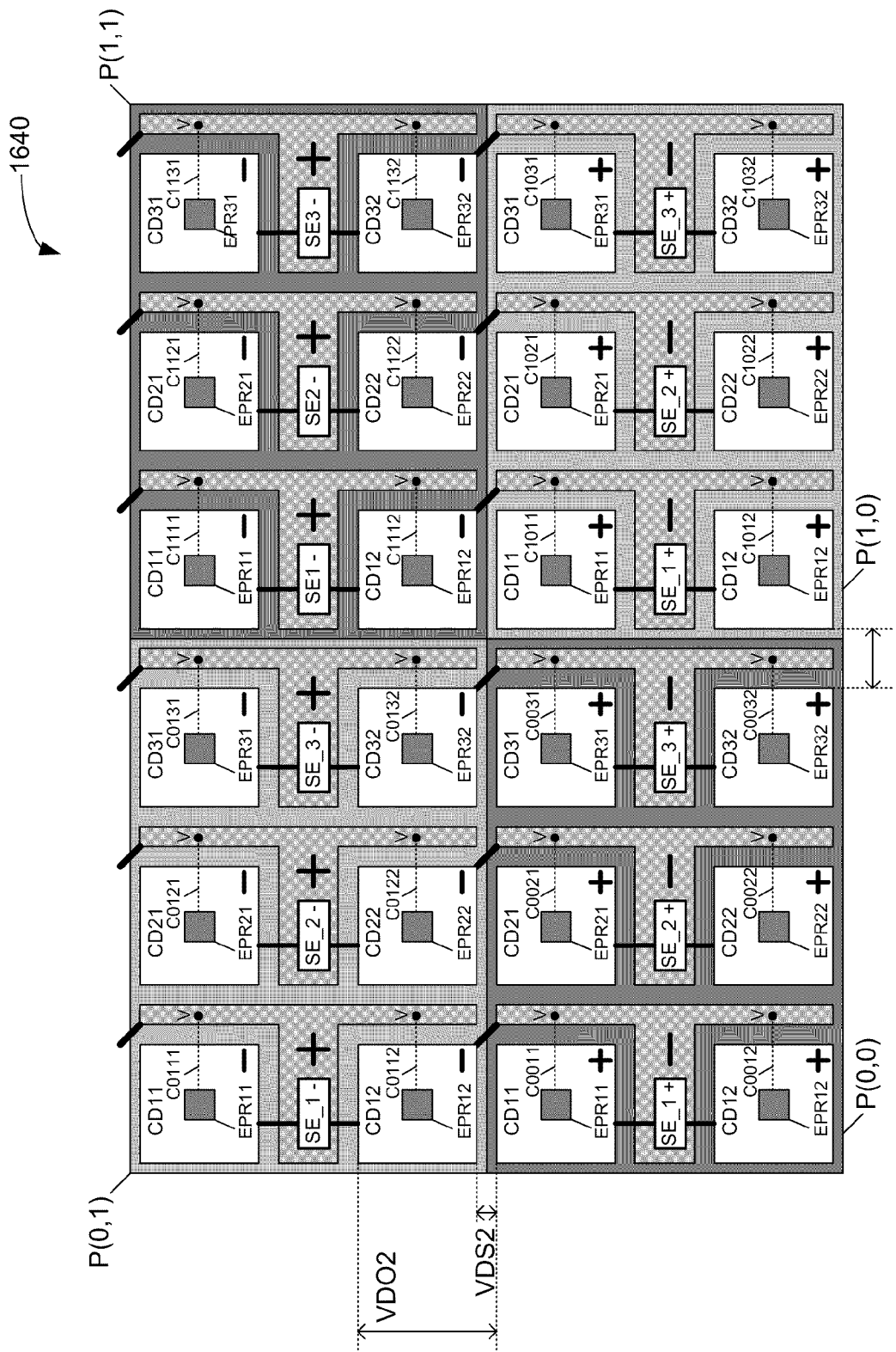
FIG. 16(f) illustrates a portion of a display in accordance with one embodiment of the present invention.

FIG. 16(f) shows another embodiment of the present invention in which the embedded polarity regions receive polarity from the fringe field amplifying region. Specifically, FIG. 16(f) shows a portion of a display 1640 using pixels P(0, 0), P(1, 0), P(0, 1), and P(1, 1) of pixel design 1610 with a switching element row inversion driving scheme. Display 1640 could have thousands of rows with thousand of pixels on each row. The rows and columns would continue from the portion shown in FIG. 16(f) in the manner shown in FIG. 16(f). For clarity, the gate lines and source lines that control the switching elements are omitted in FIG. 16(f). Furthermore, to better illustrate each pixel, the area of each pixel is shaded; this shading is only for illustrative purposes in FIG. 16(f) and has no functional significance. Due to space limitations color dots are labeled as CDXY as opposed to CD_X_Y and embedded polarity regions are labeled as EPRXY as opposed to EPR_X_Y.

Because display 1640 and display 1620 are very similar only the differences are described in detail. For example, the pixels of display 1640 are arranged in the same manner as the pixels of display 1620. Furthermore, the polarity of the color dots, switching elements and fringe field amplifying regions are the same. Thus like in display 1620, a pixel P(x, y) in display 1640 also has a first dot polarity pattern when y is even and a second dot polarity pattern when y is odd. The primary difference between display 1620 and display 1640 is that the polarity for the embedded polarized regions in display 1640 is provided from the fringe field amplifying regions rather than from dedicated embedded polarity switching elements which were used in display 1620.

Specifically, as illustrated in FIG. 16(f), in display 1640 each embedded polarity regions is coupled to the nearest fringe fiend amplifying region. Specifically, an embedded polarity region EPR_X_Y of a pixel P(I, J) is coupled to fringe field amplifying region FFAR_X by a conductor C_I_J_X_Y (labeled with CIJXY in FIG. 16(f) due to space constraints), where I, J denotes the pixel (e.g. pixel P(I, J), X is the color component, Y denotes the color dot (e.g. color dot CD_X_Y (shortened in FIG. 16(f) as CDXY)) within the pixel. For example, conductor C0112 couples embedded polarity region EPR12 of pixel P(0,1) to fringe field amplifying region FFAR_1 (not specifically labeled FIG. 16(f)) of pixel P(0, 1). The conductors for the embedded polarity regions are shown with dashed lines to indicate that the conductors are in a different plane from the color dots. Typically, the color dots and fringe field amplifying regions are formed with ITO in a first plane and the conductors are formed with a metal layer in a second plane. Thus, a via (labeled V) is used to connect the fringe field amplifying regions to the conductors. In FIG. 16(f) the fringe field amplifying regions are coupled to a switching element of a neighboring pixel as explained above with respect to FIG. 16(d). However, in other embodiments of the present invention the fringe field amplifying regions may receive polarity using other methods, such as dedicated fringe field amplifying region switching elements.

As explained above the fringe field amplifying regions have an opposite polarity as compared to the color dots. Thus, providing polarity from the fringe field amplifying regions to the embedded polarity regions causes the polarity of the embedded polarity regions to be different from the polarity of the color dot. This differing polarity serves to enhance the fringe field in the color dots and reduce the touch mura effect in display 1630.

Figures 17A, 17B:
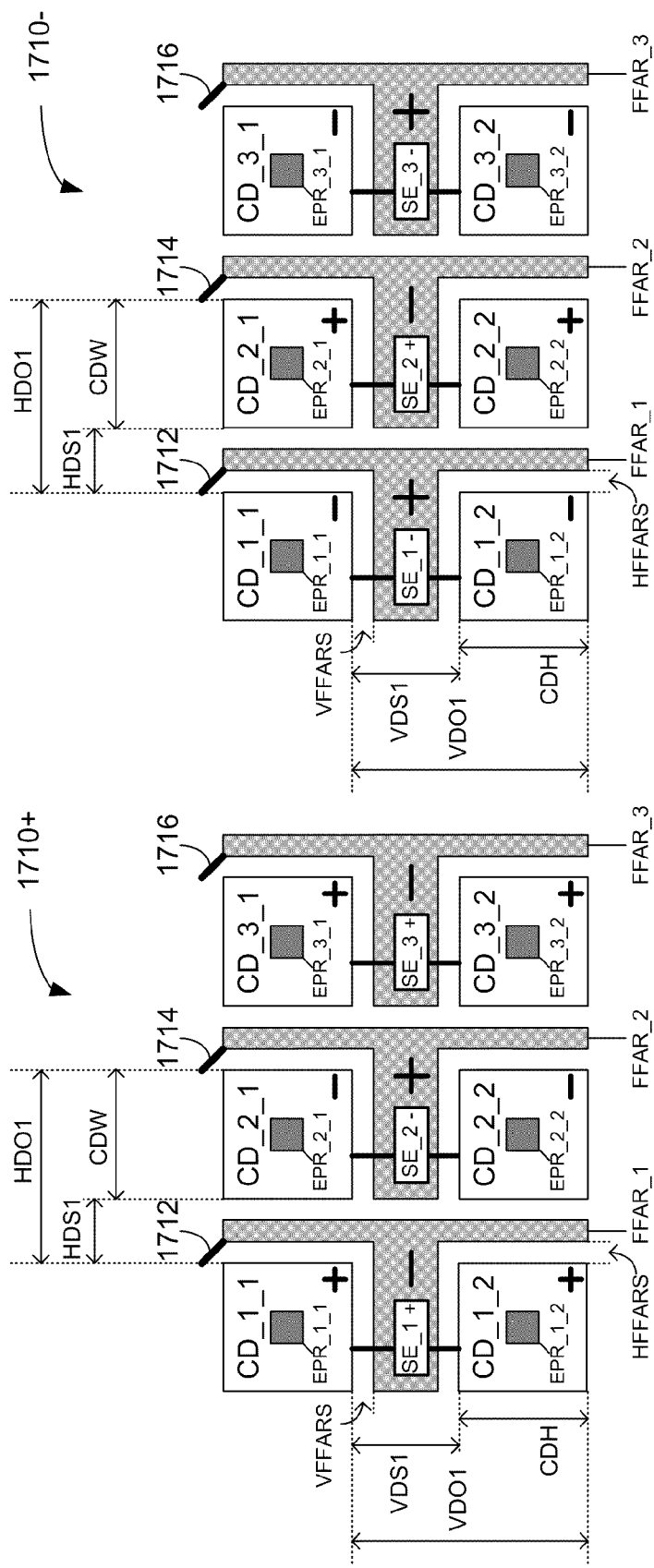
FIGS. 17(a)-17(b) illustrate a pixel design in accordance with one embodiment of the present invention.
Figure 17C:
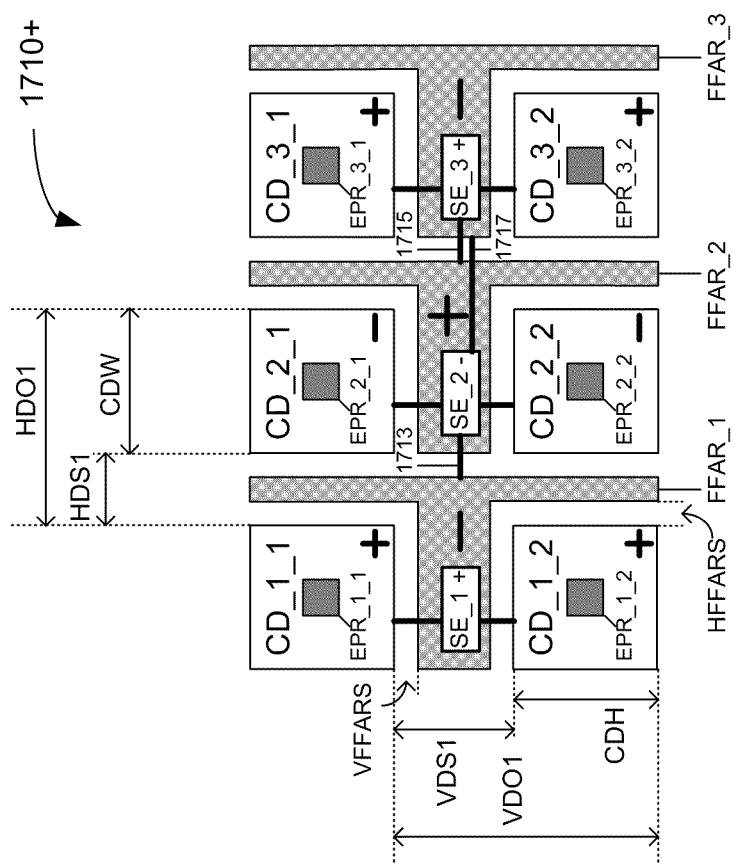
FIG. 17(c) illustrates a pixel design in accordance with one embodiment of the present invention.

Pixel design 1610 can be easily modified for use with switching element point inversion driving schemes in accordance with another embodiment of the present invention. FIG. 17(a)-17(b) show different dot polarity pattern of a pixel design 1710 that is a modified version of pixel design 1610 (FIGS. 16(a)-16(b)). Specifically, in FIG. 17(a), pixel design 1710 has a positive dot polarity pattern (and is thus labeled 1710+) and in FIG. 17(b), pixel design 1710 has a negative dot polarity pattern (and is thus labeled 1610−). Furthermore, the polarity of each polarized component in the various pixel designs are indicated with "+" for positive polarity or "−" for negative polarity.

Pixel design 1710 has three color components CC_1, CC_2 and CC_3 (not labeled in FIGS. 17(a)-17(b)). Each of the three color components includes two color dots. Pixel design 1710 also includes a switching element for each color component (referenced as SE_1, SE_2, and SE_3) and a fringe field amplifying region for each color component (referenced as FFAR_1, FFAR_2, and FFAR_3). The layout of the color dots, switching elements and fringe field amplifying regions in pixel design 1710 are identical to the layout of pixel design 1610. Thus, for brevity the description of the layout is not repeated. Switching elements SE_1, SE_2, and SE_3 are coupled to color components CC_1, CC_2, and CC_3, respectively, in the same manner as described above with regards to pixel design 1610.

Just as in pixel design 1610, each color dot of pixel design 1710 includes an embedded polarity region which would minimize any touch mura effects in the color dot. Because the placement of the embedded polarity regions are the same in pixel design 1710 and pixel design 1610, the description is not repeated. Generally, each color dot has an embedded polarity region centered within the color dot.

As explained above, the polarity of the embedded polarity region differs from that of the color dot. Thus, the polarity of the embedded polarity regions are controlled by a polarity source different from switching element SE_1 controlling the color dot containing the embedded polarity region. As described above, in some embodiments of the present invention, a display includes dedicated embedded-polarity-region switching elements to control the polarity of the embedded polarity regions (See FIG. 16(d) for one such embodiment). Other embodiments of the present invention, may couple the embedded polarity regions to other elements of the pixel that have a differing polarity (See, FIG. 16(f)).

The fringe field amplifying regions (FFAR_1, FFAR_2, and FFAR_3) of pixel design 1710 are the same as in pixel design 1610. Thus the detailed view provided in FIG. 16(c) and described above, also applies to pixel design 1710. Furthermore, the placement of the fringe field amplifying region in pixel design 1710 is the same as in pixel design 1610 as described above.

The polarities of the color dots, fringe field amplifying regions, and switching elements are shown using "+" and "−" signs. Pixel design 1710 is designed for use in displays having switching element point inversion driving schemes, but can also be used with displays having switching element column inversion driving scheme. Thus, in FIG. 17(*a*), which shows the positive dot polarity pattern of pixel design 1710+, switching elements SE_1 and SE3, color dots CD_1_1, CD_1_2, CD_3_1, and 3_2; and fringe field amplifying region FFAR_2 have positive polarity. In contrast, switching element SE_2, color dots CD_2_1 and CD_2_2; and fringe field amplifying regions FFAR_1 and FFAR2 have negative polarity. As explained above, Embedded polarity regions may have the same direction of polarity (i.e. positive or negative) as the color dot but have a different magnitude of polarity. Alternatively, embedded polarity regions may have different polarity (i.e. "direction of polarity") than the color dot (e.g. positive polarity for color dot polarity with negative polarity for embedded polarity regions). In addition, embedded polarity regions can have neutral polarity. In a particular embodiment of the present invention, the embedded polarity regions of pixel design 1710 have different polarity than the color dots. Thus for this embodiment, embedded polarity regions EPR_1_1, EPR_1_2, EPR_3_1, and EPR_3_2 would have negative polarity in FIG. 17(*a*); while embedded polarity regions EPR_2_1 EPR_2_2 would have positive polarity.

The polarities of the color dots, fringe field amplifying regions, and switching elements are shown using "+" and "−" signs. Pixel design 1710 is designed for use in displays having switching element point inversion driving schemes, but can also be used with displays having switching element column inversion driving scheme. Thus, in FIG. 17(*a*), which shows the positive dot polarity pattern of pixel design 1710+, switching elements SE_1 and SE3, color dots CD_1_1, CD_1_2, CD_3_1, and 3_2; and fringe field amplifying region FFAR_2 have positive polarity. In contrast, switching element SE_2, color dots CD_2_1 and CD_2_2; and fringe field amplifying regions FFAR_1 and FFAR2 have negative polarity. As explained above, embedded polarity regions may have the same direction of polarity (i.e. positive or negative) as the color dot but have a different magnitude of polarity. Alternatively, embedded polarity regions may have different polarity (i.e. "direction of polarity") than the color dot (e.g. positive polarity for color dot polarity with negative polarity for embedded polarity regions). In addition, embedded polarity regions can have neutral polarity. In a particular embodiment of the present invention, the embedded polarity regions of pixel design 1710 have different polarity than the color dots. Thus for this embodiment, embedded polarity regions EPR_1_1, EPR_1_2, EPR_3_1, and EPR_3_2 would have negative polarity in FIG. 17(*a*); while embedded polarity regions EPR_2_1 EPR_2_2 would have positive polarity.

In FIG. 17(*b*), which shows the positive dot polarity pattern of pixel design 1710+, switching elements SE_1 and SE3, color dots CD_1_1, CD_1_2, CD_3_1, and 3_2; and fringe field amplifying region FFAR_2 have negative polarity. In contrast, switching element SE_2, color dots CD_2_1 and CD_2_2; and fringe field amplifying regions FFAR_1 and FFAR2 have positive polarity. As explained above, embedded polarity regions may have the same direction of polarity (i.e. positive or negative) as the color dot but have a different magnitude of polarity. Alternatively, embedded polarity regions may have different polarity (i.e. "direction of polarity") than the color dot (e.g. positive polarity for color dot polarity with negative polarity for embedded polarity regions). In addition, embedded polarity regions can have neutral polarity. In a particular embodiment of the present invention, the embedded polarity regions of pixel design 1710 have different polarity than the color dots. Thus for this embodiment, embedded polarity regions EPR_1_1, EPR_1_2, EPR_3_1, and EPR_3_2 would have positive polarity in FIG. 17(*b*); while embedded polarity regions EPR_2_1 and EPR_2_2 would have negative polarity.

Unlike the switching elements if pixel design 1610, the switching elements in pixel design 1710 have both positive and negative polarity. Specifically, switching elements SE_1 and SE_3 have one polarity while switching element SE_2 has the other polarity. Thus, the fringe field amplifying regions could be polarized from the switching elements within pixel design 1710. FIG. 17(*c*) described below shows a pixel design 1710-1, in accordance with one embodiment of the present invention in which the fringe field amplifying regions are polarized from within pixel design 1710. In other embodiments, the fringe field amplifying regions are driven by an external polarity source, i.e. a polarity source from outside the specific pixel of pixel design 1710. Various sources of opposite polarity can be used in accordance with differing embodiments of the present invention. For example specific fringe field amplifying region switching elements may be used or switching elements of nearby pixels having the appropriate dot polarity could also used to drive the fringe field amplifying regions. In the embodiments of FIGS. 17(*a*)-17(*b*), switching elements of nearby pixels having the appropriate dot polarity could also used to drive the fringe field amplifying regions. Therefore, pixel design 1710 includes conductor to facilitate coupling the fringe field amplifying regions to switching elements in other pixels. Specifically, a conductor 1712 of a current pixel would couple the electrode of fringe field amplifying region FFAR_1 to switching element SE_1 (see FIGS. 17(*d*) and 17(*e*)) of a pixel above the current pixel. The connection to the switching element would be via the electrodes of the color dots of the pixel above the current pixel. Similarly, a conductor 1714 of a current pixel would couple the electrode of fringe field amplifying region FFAR_2 to switching element SE_2 (see FIG. 17(*d*)) of a pixel above the current pixel. The connection to the switching element would be via the electrodes of the color dots of the pixel above the current pixel. A conductor 1716 of a current pixel would couple the electrode of fringe field amplifying region FFAR_3 to switching element SE_3 (see FIGS. 17(*d*) and 17(*e*)) of a pixel above the current pixel. The connection to the switching element would be via the electrodes of the color dots of the pixel above the current pixel. These connections are better shown in FIGS. 17(*d*) and 17(*e*) which are described below.

FIG. 17(*c*) shows a pixel design 1710-1 which is a modified version of pixel design 1710. Since the pixel designs are similar only the differences are described. Specifically in pixel design 1710-1, conductors 1712, 1714, and 1716 are replaced with conductors 1713, 1715, and 1717, respectively. Conductor 1713 couples fringe field amplifying region FFAR_1 to switching element SE_2, which has negative polarity. Conductor 1715 couples fringe field amplifying region FFAR_2 to switching element SE_3, which has positive polarity. Conductor 1717 couples fringe field amplifying region FFAR_3 to switching element SE_2, which has negative polarity.

FIG. 17(*d*) shows a portion of display 1720 using pixels P(0, 0), P(1, 0), P(0, 1), and P(1, 1) of pixel design 1710 with a switching element row inversion driving scheme. Display 1720 could have thousands of rows with thousand of pixels on each row. The rows and columns would continue from the portion shown in FIG. 17(*d*) in the manner shown in FIG. 17(*d*). For clarity, the gate lines and source lines that control the switching elements are omitted in FIG. 17(d). Furthermore, to better illustrate each pixel, the area of each pixel is shaded; this shading is only for illustrative purposes in FIG. 17(d) and has no functional significance. Due to space limitations color dots are labeled as CDXY as opposed to CD_X_Y and embedded polarity regions are labeled as EPRXY as opposed to EPR_X_Y.

The pixels of display 1720 are arranged so that pixels in a row alternate between the positive dot polarity pattern and the negative dot polarity pattern. Furthermore, pixels in a column also alternate between the positive dot polarity pattern and the negative dot polarity pattern. Thus, pixels P(0, 0) and P(1, 1) have the positive dot polarity pattern and pixels P(0, 1) and P(1, 0) have the negative dot polarity pattern. However, at the next frame the pixels will switch dot polarity patterns. Thus in general a pixel P(x, y) has a first dot polarity pattern when x+y is even and a second dot polarity pattern when x+y is odd. Internal conductors 1712, 1714, and 1716 in pixel design 1710, provide polarity to the fringe field amplifying regions. Specifically, fringe field amplifying regions of a first pixel receive voltage polarity and voltage magnitude from a second pixel. Specifically, the second pixel is the pixel above the first pixel. For example, the electrodes of fringe field amplifying region FFAR_1 of pixel P(0, 0) is coupled to switching elements SE_1 of pixel P(0, 1) via the electrodes of color dots CD_1_2 of pixel P(0, 1). Similarly, the electrodes of fringe field amplifying regions FFAR_2 and FFAR_3 of pixel P(0, 0) are coupled to switching elements SE_2, and SE_3 of pixel P(0, 1) via color dots CD_2_2, and CD_3_2 of pixel P(0, 1), respectively.

In display 1720, a first pixel is paired with a second pixel, so that the embedded polarity regions of the first pixel is coupled to the switching element of the second pixel and the embedded polarity regions of the second pixel is coupled to the switching elements of the first pixel. Specifically, pixels on even numbered rows are paired with the pixel in the odd numbered row above the even numbered row. Thus in FIG. 17(d), pixel P(0,0) is paired with Pixel P(0,1) and pixel P(1,0) is paired with pixel P(1,1). In general, a pixel P(X,Y) is paired with a pixel P(X,Y+1) if Y is even. Conversely, a pixel P(x,Y) is paired with pixel P(X,Y-1) if Y is odd.

Figure 17D:
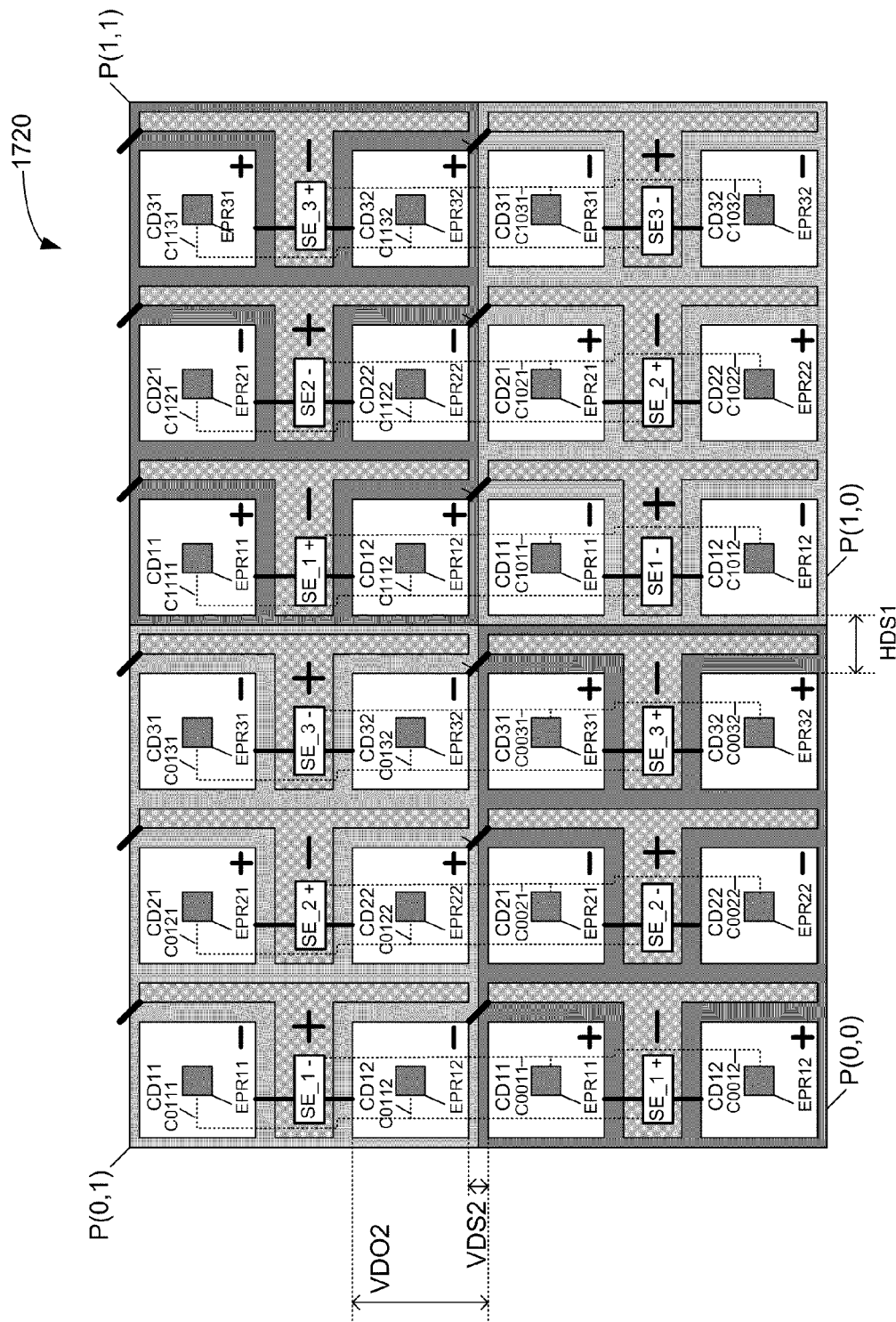
FIG. 17(d) illustrates a portion of a display in accordance with one embodiment of the present invention.

As illustrated in FIG. 17(d), in display 1720 each embedded polarity regions is coupled to a switching element of paired pixel by a conductor C_I_J_X_Y (labeled with CIJXY in FIG. 17(d) due to space constraints), where I, J denotes the pixel (e.g. pixel P(I, J) containing the embedded polarity region, X is the color component, and Y denotes the color dot (e.g. color dot CD_X_Y (shortened in FIG. 17(d) as CDXY)) within the pixel. For example, conductor C0112 couples embedded polarity region EPR12 of pixel P(0,1) to switching element SE_1 of pixel P(0, 0). The conductors for the embedded polarity regions are shown with dashed lines to indicate that the conductors are in a different plane from the color dots. Typically, the color dots are formed with ITO in a first plane and the conductors are formed with a metal layer in a second plane.

As explained above in pixels on odd numbered rows, embedded polarity elements of a first pixel are coupled to switching elements of the pixel below the first pixel. For example, embedded polarity region EPR_2_2 (labeled EPR22 in FIG. 17(d)) of pixel P(0, 1) is coupled to switching element SE_2 of pixel P(0, 0) by conductor C_0_1_2_2 (labeled C0122 in FIG. 17(d)). Similarly, embedded polarity region EPR_2_1 (labeled EPR21 in FIG. 17(d)) of pixel P(0, 1) is coupled to switching element SE_2 of pixel P(0, 0) by conductor C_0_1_2_1 (labeled C0121 in FIG. 17(d)). In general, a conductor C_I_J_X_Y, couples embedded polarity region EPR_X_Y of a pixel P(I, J) to switching element SE_X of pixel P(I, J-1), when J is an odd number.

In pixels on even numbered rows, embedded polarity elements of a first pixel are coupled to switching elements of the pixel above the first pixel. For example, embedded polarity region EPR_2_2 (labeled EPR22 in FIG. 17(d)) of pixel P(0, 0) is coupled to switching element SE_2 of pixel P(0, 1) by conductor C_0_0_2_2 (labeled C0022 in FIG. 17(d)). Similarly, embedded polarity region EPR_2_1 (labeled EPR21 in FIG. 17(d)) of pixel P(0, 0) is coupled to switching element SE_2 of pixel P(0, 1) by conductor C_0_0_2_1 (labeled C0021 in FIG. 17(d)). In general, a conductor C_I_J_X_Y, couples embedded polarity region EPR_X_Y of a pixel P(I, J) to switching element SE_X of pixel P(I, J+1), when J is an even number.

As explained above adjacent row of pixels have opposite polarity in display 1720. Thus, providing polarity from switching elements in pixels from adjacent rows to embedded polarity regions as described above causes the polarity of the embedded polarity regions to be different from the polarity of the color dot. This differing polarity serves to enhance the fringe field in the color dots and reduce the touch mura effect in display 1720.

As explained above adjacent row of pixels have opposite polarity in display 1720. Thus, providing polarity from switching elements in pixels from adjacent rows to embedded polarity regions as described above causes the polarity of the embedded polarity regions to be different from the polarity of the color dot. This differing polarity serves to enhance the fringe field in the color dots and reduce the touch mura effect in display 1720.

Figure 17E:
FIG. 17(e) illustrates a portion of a display in accordance with one embodiment of the present invention.

FIG. 17(e) shows another embodiment of the present invention in which the embedded polarity regions receive polarity from the fringe field amplifying region. Specifically, FIG. 17(e) shows a portion of a display 1730 using pixels P(0, 0), P(1, 0), P(0, 1), and P(1, 1) of pixel design 1710 with a switching element point inversion driving scheme. Display 1730 could have thousands of rows with thousand of pixels on each row. The rows and columns would continue from the portion shown in FIG. 17(e) in the manner shown in FIG. 17(e). For clarity, the gate lines and source lines that control the switching elements are omitted in FIG. 17(e). Furthermore, to better illustrate each pixel, the area of each pixel is shaded; this shading is only for illustrative purposes in FIG. 17(e) and has no functional significance. Due to space limitations color dots are labeled as CDXY as opposed to CD_X_Y and embedded polarity regions are labeled as EPRXY as opposed to EPR_X_Y.

Because display 1730 and display 1720 are very similar only the differences are described in detail. For example, the pixels of display 1730 are arranged in the same manner as the pixels of display 1720. Furthermore, the polarity of the color dots, switching elements and fringe field amplifying regions are the same. Thus like in display 1720, a pixel P(x, y) in display 1730 also has a first dot polarity pattern when x+y is even and a second dot polarity pattern when x+y is odd. The primary difference between display 1720 and display 1730 is that the embedded polarized regions in display 1730 is coupled to the fringe field amplifying regions to receive polarity.

Specifically, as illustrated in FIG. 17(e), in display 1730 each embedded polarity regions is coupled to the nearest fringe fiend amplifying region. Specifically, an embedded polarity region EPR_X_Y of a pixel P(I, J) is coupled to fringe field amplifying region FFAR_X by a conductor C_I_J_X_Y (labeled with CIJXY in FIG. 17(e) due to space constraints), where I, J denotes the pixel (e.g. pixel P(I, J), X is the color component, Y denotes the color dot (e.g. color dot CD_X_Y (shortened in FIG. 17(e) as CDXY)) within the pixel. For example, conductor C0112 couples embedded polarity region EPR12 of pixel P(0,1) to fringe field amplifying region FFAR_1 (not specifically labeled FIG. 17(e)) of pixel P(0, 1). The conductors for the embedded polarity regions are shown with dashed lines to indicate that the conductors are in a different plane from the color dots. Typically, the color dots and fringe field amplifying regions are formed with ITO in a first plane and the conductors are formed with a metal layer in a second plane. Thus, a via (labeled V) is used to connect the fringe field amplifying regions to the conductors. In FIG. 17(e) the fringe field amplifying regions are coupled to a switching element of a neighboring pixel as explained above with respect to FIG. 17(d). However, in other embodiments of the present invention the fringe field amplifying regions may receive polarity using other methods, such as dedicated fringe field amplifying region switching elements.

As explained above the fringe field amplifying regions have an opposite polarity as compared to the color dots. Thus, providing polarity from the fringe field amplifying regions to the embedded polarity regions causes the polarity of the embedded polarity regions to be different from the polarity of the color dot. This differing polarity serves to enhance the fringe field in the color dots and reduce the touch mura effect in display 1720.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiment described. For example, in view of this disclosure those skilled in the art can define other pixel definitions, embedded polarity regions, field reduction layers, insulating layers, conducting layers, voids, dot polarity patterns, pixel designs, color components, polarity extension regions, polarities, fringe fields, electrodes, substrates, films, and so forth, and use these alternative features to create a method or system according to the principles of this invention. Thus, the invention is limited only by the following claims.

What is claimed is:

1. A display comprising:
a first pixel having a first first-pixel switching element;
a first electrode coupled to the first first-pixel switching element;
a second pixel comprising
a first second-pixel color component having
a first second-pixel first-component color dot having a first embedded polarity region, wherein the first embedded polarity region is coupled to the first first-pixel switching element; and
a second second-pixel first-component color dot having a second embedded polarity region; and
a first second-pixel switching element coupled to the first second-pixel first-component color dot and the second second-pixel first-component color dot;
wherein the first electrode lies between the first second-pixel first-component color dot and the second second-pixel first-component color dot.

2. The display of claim 1, wherein the first pixel further comprises a first first-pixel color component having a first first-pixel first-component color dot, and wherein the first electrode is part of the first first-pixel first-component color dot.

3. The display of claim 1, wherein the first electrode is a fringe field amplifying region of the second pixel.

4. The display of claim 3, wherein the first electrode further comprises:
a first first-electrode horizontal amplifying portion, extending along a first side of the first second-pixel first-component color dot and along a first side of the second second-pixel first-component color dot; and
a first first-electrode vertical amplifying portion extending along a second side of the first second-pixel first-component color dot and along a second side of the second second-pixel first-component color dot.

5. The display of claim 1, wherein the first first-pixel switching element is configured to have a first polarity when the first second-pixel switching element is configured to have a second polarity.

6. The display of claim 1, wherein the first embedded polarity region comprises a field reduction layer.

7. The display of claim 6, wherein the field reduction layer has a cylindrical shape.

8. The display of claim 6, wherein the field reduction layer has a pyramidal shape.

9. The display of claim 6, wherein the field reduction layer has a cone shape.

10. The display of claim 6, wherein the field reduction layer is an ellipsoid.

11. The display of claim 6, wherein the field reduction layer has a triangular solid shape.

12. The display of claim 6, wherein the field reduction layer has a convex depression at a top side of the field reduction layer.

13. The display of claim 6, wherein the field reduction layer further comprises an insulating layer and a conducting layer.

14. The display of claim 13, wherein the insulating layer lies between an electrode of the first second-pixel first-component color dot and the conducting layer.

15. The display of claim 14, wherein the conducting layer of the first embedded polarity region is coupled to a first embedded polarity region switching element.

16. The display of claim 15, wherein the first embedded polarity region switching element is configured to have a first polarity when the first second-pixel switching element is configured to have a first polarity.

17. The display of claim 14, wherein the electrode of the first second-pixel first-component color dot includes a void, and wherein the conducting layer is located below the void.

18. The display of claim 6, wherein the first embedded polarity region comprises a changed conductivity region within an electrode of the first second-pixel first-component color dot.

19. The display of claim 1, wherein the second embedded polarity region is coupled to the first first-pixel switching element.

20. The display of claim 19, wherein the first pixel further comprises a first first-pixel color component having
a first first-pixel first-component color dot having a third embedded polarity region; and
a second first-pixel first-component color dot having a fourth embedded polarity region;
wherein the first first-pixel switching element is coupled to the first first-pixel first-component color dot and the second first-pixel first-component color dot.

21. The display of claim 20, wherein the third embedded polarity region is coupled to the first second-pixel switching element.

22. The display of claim 21, wherein the fourth embedded polarity region is coupled to the first second-pixel switching element.

23. The display of claim 1, wherein the second pixel further comprises:
 a second second-pixel color component having
  a first second-pixel second-component color dot having a third embedded polarity region; and
  a second second-pixel second-component color dot having a fourth embedded polarity region; and
 a second second-pixel switching element coupled to the first second-pixel second-component color dot and the second second-pixel second-component color dot.

24. The pixel of claim 23, wherein:
 the first second-pixel first-component color dot is aligned with the first second-pixel second-component color dot in a first dimension;
 the first second-pixel first-component color dot is aligned with the second second-pixel first-component color dot in a second dimension; and
 the second second-pixel first-component color dot is aligned with the second second-pixel second-component color dot in the first dimension.

25. The pixel of claim 23, wherein the first second pixel switching element is configured to a first polarity when the second second-pixel switching element is configured to the first polarity.

26. The pixel of claim 23, wherein the first second pixel switching element is configured to a first polarity when the second second-pixel switching element is configured to a second polarity.

27. The pixel of claim 1, wherein the first second-pixel color component further comprises a third second-pixel first-component color dot having a third embedded polarity region.

28. A display comprising:
 a first pixel having a first first-pixel switching element;
 a first electrode coupled to the first first-pixel switching element;
 a second pixel comprising
  a first second-pixel color component having
   a first second-pixel first-component color dot having a first embedded polarity region, wherein the first embedded polarity region comprises a field reduction layer and a changed conductivity region within an electrode of the first second-pixel first-component color dot; and
   a second second-pixel first-component color dot having a second embedded polarity region; and
  a first second-pixel switching element coupled to the first second-pixel first-component color dot and the second second-pixel first-component color dot;
 wherein the first electrode lies between the first second-pixel first-component color dot and the second second-pixel first-component color dot;
 wherein the changed conductivity region is a heavily doped region.

29. The display of claim 28, wherein the changed conductivity region is a formed with a non-conductive material.

30. A display comprising:
 a first pixel having a first first-pixel switching element;
 a first electrode coupled to the first first-pixel switching element;
 a second pixel comprising
  a first second-pixel color component having
   a first second-pixel first-component color dot having a first embedded polarity region, wherein the first embedded polarity region is coupled to the first electrode; and
   a second second-pixel first-component color dot having a second embedded polarity region; and
  a first second-pixel switching element coupled to the first second-pixel first-component color dot and the second second-pixel first-component color dot;
 wherein the first electrode lies between the first second-pixel first-component color dot and the second second-pixel first-component color dot.

31. The display of claim 30, wherein the second embedded polarity region is coupled to the first electrode.

32. A display comprising:
 a first pixel having a first first-pixel switching element;
 a first electrode coupled to the first first-pixel switching element;
 a second pixel comprising
  a first second-pixel color component having
   a first second-pixel first-component color dot having a first embedded polarity region; and
   a second second-pixel first-component color dot having a second embedded polarity region; and
   a third second-pixel first-component color dot having a third embedded polarity region;
  a first second-pixel switching element coupled to the first second-pixel first-component color dot and the second second-pixel first-component color dot;
 wherein the first electrode lies between the first second-pixel first-component color dot and the second second-pixel first-component color dot; and
 wherein the first second-pixel first-component color dot is aligned with the second second-pixel first-component color dot in a first dimension; and wherein the third second-pixel first-component color dot is offset from the first second-pixel first-component color dot in the first dimension and a second dimension.

* * * * *